(12) United States Patent
Setlur et al.

(10) Patent No.: US 11,868,343 B2
(45) Date of Patent: Jan. 9, 2024

(54) UTILIZING AUTOCOMPLETION AS A DATA DISCOVERY SCAFFOLD FOR SUPPORTING VISUAL ANALYSIS

(71) Applicant: Tableau Software, LLC, Seattle, WA (US)

(72) Inventors: Vidya Raghavan Setlur, Portola Valley, CA (US); Md Enamul Hoque Prince, Ajax, CA (US); Dae Hyun Kim, Stanford, CA (US); Angel Xuan Chang, Palo Alto, CA (US)

(73) Assignee: Tableau Software, LLC, Seattle, WA (US)

( * ) Notice: Subject to any disclaimer, the term of this patent is extended or adjusted under 35 U.S.C. 154(b) by 739 days.

(21) Appl. No.: 17/010,770

(22) Filed: Sep. 2, 2020

(65) Prior Publication Data

US 2021/0349950 A1 Nov. 11, 2021

Related U.S. Application Data

(60) Provisional application No. 63/021,066, filed on May 6, 2020.

(51) Int. Cl.
*G06F 16/332* (2019.01)
*G06F 16/2452* (2019.01)
(Continued)

(52) U.S. Cl.
CPC ...... *G06F 16/24522* (2019.01); *G06F 16/904* (2019.01); *G06F 16/90332* (2019.01);
(Continued)

(58) Field of Classification Search
CPC ... G06F 16/3322; G06F 3/0237; G06F 16/532
See application file for complete search history.

(56) References Cited

U.S. PATENT DOCUMENTS

| | | | |
|---|---|---|---|
| 6,564,213 B1* | 5/2003 | Ortega | G06F 16/3322 |
| | | | 707/999.005 |
| 2014/0325405 A1* | 10/2014 | Smolinski | G06V 30/387 |
| | | | 715/764 |

(Continued)

OTHER PUBLICATIONS

Tableau Software, LLC, International Search Report and Written Opinion, PCT/US2021/028308, dated Aug. 6, 2021, 12 pgs.

(Continued)

*Primary Examiner* — Feng-Tzer Tzeng
(74) *Attorney, Agent, or Firm* — Morgan, Lewis & Bockius LLP

(57) ABSTRACT

A method utilizes data discovery to support visual analysis of datasets. A user selects a data source, and the method presents a natural language interface for analysis of the data source. A user specifies an incomplete natural language command directed to the data source, and the method correlates words in the incomplete natural language command with a data field in the data source. The method determines the data type of the data field and a range of data values for the data field. According to the data type and the range of data values, the method presents one or more autocompletion options for the incomplete natural language command. Each option includes respective text and a respective corresponding visual graphic. The user selects one of the autocompletion options, and the method forms a complete natural language command. The method then displays a data visualization according to the complete natural language command.

19 Claims, 42 Drawing Sheets

(51) Int. Cl.
  *G06F 16/9032* (2019.01)
  *G06F 40/205* (2020.01)
  *G06F 16/904* (2019.01)
  *G06F 16/532* (2019.01)

(52) U.S. Cl.
  CPC ........ *G06F 40/205* (2020.01); *G06F 16/3322* (2019.01); *G06F 16/532* (2019.01)

(56) References Cited

U.S. PATENT DOCUMENTS

2017/0277770 A1* 9/2017 Singh .................. G06F 16/3322
2019/0012876 A1 1/2019 Brahmandam et al.

OTHER PUBLICATIONS

Tableau Software. LLC, International Preliminary Report on Patentability, PCT/US2021/028308, dated Nov. 8, 2022, 8 pgs.
Setlur et al., Eviza: A Natural Language Interface for Visual Analysis, ACM Oct. 16, 2016, 13 pgs.

* cited by examiner

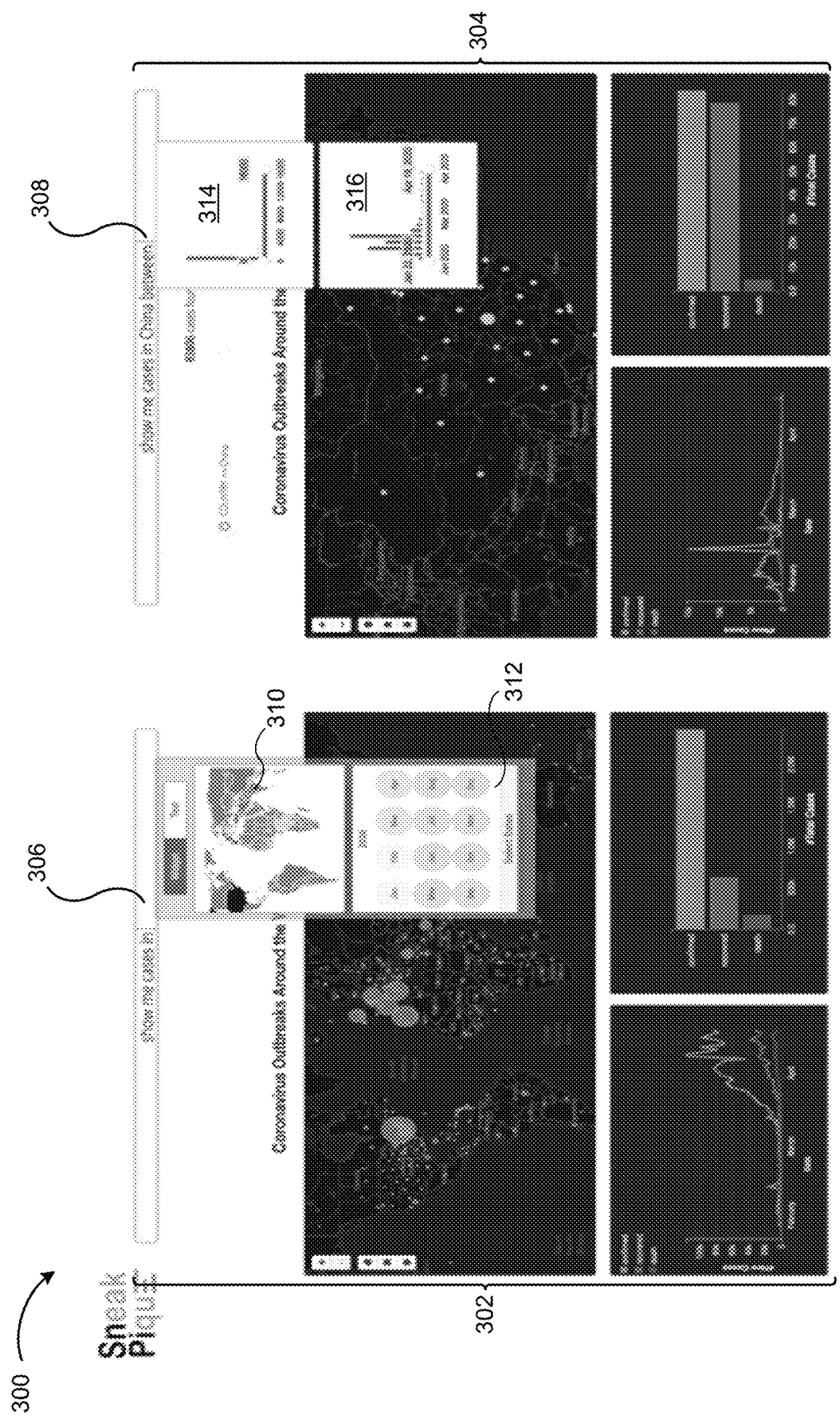
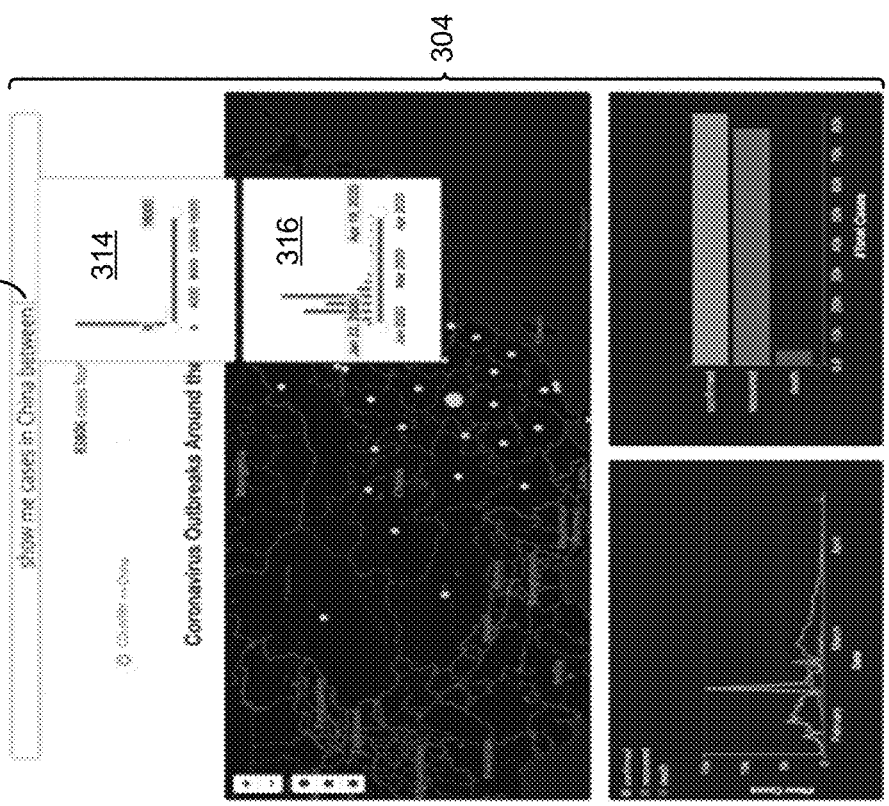
Figure 3A
Figure 3B

| Data type | Text autocompletion | | | Widget autocompletion | | |
|---|---|---|---|---|---|---|
| 1. Categorical 502 | a) List (no DP) 512 | b) Alphabetical (DP) 514 | c) By data frequency (DP) 516 | d) Bar chart 518 Unsorted (DP) | e) Bar chart 520 Alphabetically (DP) | f) Bar chart 522 By data frequency (DP) / g) Bar hierarchy (DP) 524 |
| 2. Numeric 504 | a) Range in text (no DP) 526 | | | b) Slider (no DP) 528 | c) Histogram slider (DP) 530 | |
| 3. Geospatial 506 | a) Geospatial list (no DP) 532 | b) By data frequency (DP) 534 | c) Geospatial hierarchy (no DP/DP) 536 | d) Map chart (no DP) 538 | e) Map chart (DP) 540 | f) Geospatial hierarchy (DP) 542 |
| 4. Temporal 508 | a) Chronological (no DP) 544 | b) Chronological (DP) 546 | c) By data frequency (DP) 548 | d) Calendar (no DP) 550 | e) Calendar (DP) 552 | f) Temporal hierarchy (DP) 554 / g) Histogram slider (DP) 556 |
| 5. Semantic grouping (geospatial and time) 510 | a) Semantic grouping (no DP) 558 | b) Semantic grouping (DP) 560 | | c) Map + Calendar (no DP) 562 | d) Map + Calendar (DP) 564 | |

944 — When the data type is a categorical type, display a text list that shows suggestions for a categorical data field. The suggestions are sorted numerically according to data frequency, and the text list includes a data preview that shows respective data frequencies for data values of the data field.

Figure 9E

946 — When the data type is a numeric type, display a histogram slider widget that shows a histogram of data frequencies for a numerical data field.

Figure 9F

948 — When the data type is a geospatial type, display a map chart widget that shows a data preview of location values for a data field, showing numeric ranges as visual encodings.

Figure 9G

950 — When the data type is a temporal type, display either (i) a text list that shows temporal data for a data field sorted in chronological order, (ii) a calendar widget that shows a temporal hierarchy of a first temporal data field, or (iii) a histogram slider widget that shows a histogram of data frequencies for a second temporal data field.

Figure 9H

952 — When the data type is both a geospatial type and a temporal type, display either (i) a text list with semantic grouping for hierarchical data, or (ii) a combination of map and calendar widgets.

Figure 9I

954 — When the data type corresponds to hierarchical data, provide one or more text autocompletion options for selecting hierarchy values.

Figure 9J

956 — Detect user input to select the respective text instead of the respective corresponding visual graphic for the data field.

958 — In response to detecting the user input to select the respective text, switch from displaying the respective corresponding visual graphic to displaying the respective text. The respective text provides one or more text autocompletion options.

Figure 9K

UTILIZING AUTOCOMPLETION AS A DATA DISCOVERY SCAFFOLD FOR SUPPORTING VISUAL ANALYSIS

RELATED APPLICATIONS

This application claims priority to U.S. Provisional Patent Application 63/021,066, filed May 6, 2020, entitled "Utilizing Autocompletion as a Data Discovery Scaffold for Supporting Visual Analysis," which is incorporated by reference herein in its entirety.

This application is related to U.S. Provisional Patent Application 62/991,342, filed Mar. 8, 2020, entitled "Incorporating Data Visualizations into Database Conversational Interfaces," which is incorporated by reference herein in its entirety.

This application is related to U.S. patent application Ser. No. 15/804,991, filed Nov. 6, 2017, entitled "Systems and Methods of Using Natural Language Processing for Visual Analysis of a Data Set," which is incorporated by reference herein in its entirety.

This application is related to U.S. patent application Ser. No. 16/234,470, filed Dec. 27, 2018, entitled "Analyzing Underspecified Natural Language Utterances in a Data Visualization User Interface," which is incorporated by reference herein in its entirety.

This application is also related to U.S. patent application Ser. No. 16/221,413, filed Dec. 14, 2018, entitled "Data Preparation User Interface with Coordinated Pivots," which is incorporated by reference herein in its entirety.

This application is also related to U.S. patent application Ser. No. 16/236,611, filed Dec. 30, 2018, entitled "Generating Data Visualizations According to an Object Model of Selected Data Sources," which is incorporated by reference herein in its entirety.

This application is also related to U.S. patent application Ser. No. 16/236,612, filed Dec. 30, 2018, entitled "Generating Data Visualizations According to an Object Model of Selected Data Sources," which is incorporated by reference herein in its entirety.

This application is also related to U.S. patent application Ser. No. 16/679,234, filed Nov. 10, 2019, entitled "Data Preparation Using Semantic Roles," which is incorporated by reference herein in its entirety.

TECHNICAL FIELD

The disclosed implementations relate generally to natural language processing, and more specifically to systems, methods, and user interfaces for providing relevant autocompletion suggestions based on data values for data fields identified in the commands.

BACKGROUND

Natural language interaction has evolved as a useful modality to help users explore and interact with their data during visual analysis. However, little work has been done to explore how autocompletion can help with data discovery while helping users formulate analytical questions. Traditional interfaces focus on syntactic query completion without any guidance as to what is in the underlying data. Currently available systems that support autocompletion do not help with data discovery. Furthermore, conventional systems do not take into account user preferences for autocompletion to support visual analysis in a natural language interface.

SUMMARY

To address these problems, some implementations use a design probe (sometimes called the "Sneak Pique System") to explore how autocompletion can better support users during their analytic workflows.

A novel system called "Sneak Pique" illustrates the usefulness of autocompletion for visual analysis. Three Mechanical Turk studies evaluated user preferences for various text and visualization widget-based autocompletion design variants for helping with partial search queries. The findings indicate that users found data previews to be useful in the suggestions. Widgets were preferred for previewing temporal, geospatial, and numerical data while text autocompletion was preferred for categorical and hierarchical data. Exploratory analysis of the system was conducted implementing this specific subset of preferred autocompletion variants. Insights regarding the efficacy of these autocompletion suggestions facilitated design of natural language interfaces supporting visual analysis.

In accordance with some implementations, a method utilizes data discovery to support visual analysis of datasets. The method is performed at a computing system having one or more processors and memory storing one or more programs configured for execution by the one or more processors. A user selects a data source and the system presents a natural language interface for analysis of data in the selected data source. The user specifies an incomplete natural language command directed to the data source and the system correlates one or more words in the incomplete natural language command with a data field in the selected data source. The system also determines the data type of the data field and determines the range of data values in the data source for the data field. In accordance with the data type and the range of data values, the system presents one or more autocompletion options for the incomplete natural language command. Each option includes respective text and a respective corresponding visual graphic. When the user selects an option of the one or more autocompletion options, the system forms a complete natural language command and displays a data visualization according to the complete natural language command.

In some implementations, correlating the one or more words in the incomplete natural language command with the data field in the selected data source includes: (i) generating grammar rules based on attribute values from a dataset underlying the selected data source; (ii) determining if the one or more words in the incomplete natural language command includes a partially complete query by parsing the incomplete natural language command using the grammar rules and detecting grammar parse tree errors; and (iii) in accordance with a determination that the incomplete natural language command includes a partially complete query: (a) computing a syntactic structure of the partially complete query along with relevant grammar rules that would be satisfied if the partially complete query were complete; and (b) selecting the data field from the selected data source based on the relevant grammar rules.

In some implementations, correlating the one or more words in the incomplete natural language command is based on analyzing user preferences for text autocompletion or widget autocompletion for different data types including categorical data, numeric data, geospatial data, temporal data, and combinations thereof.

In some implementations, presenting the one or more autocompletion options for the incomplete natural command includes: in accordance with a determination that the data type is a categorical type, displaying a text list that shows suggestions for a categorical data field. The suggestions are sorted numerically according to data frequency, and the text list includes a data preview that shows respective data frequencies for the suggestions.

In some implementations, presenting the one or more autocompletion options for the incomplete natural command includes, in accordance with a determination that the data type is a numeric type, displaying a histogram slider widget that shows a histogram of data frequencies for a numerical data field from the data source.

In some implementations, presenting the one or more autocompletion options for the incomplete natural command includes, in accordance with a determination that the data type is a geospatial type, displaying a map chart widget that shows a data preview of location values for a data field, showing numeric ranges as visual encodings.

In some implementations, presenting the one or more autocompletion options for the incomplete natural command includes, in accordance with a determination that the data type is a temporal type, displaying either (i) a text list that shows temporal data for a first data field sorted in chronological order, (ii) a calendar widget that shows a temporal hierarchy of a first temporal data field, or (iii) a histogram slider widget that shows a histogram of data frequencies for a second temporal data field.

In some implementations, presenting the one or more autocompletion options for the incomplete natural command includes, in accordance with a determination that the data type is both a geospatial type and a temporal type, displaying either (i) a text list with semantic grouping for hierarchical data, or (ii) a combination of map and calendar widgets.

In some implementations, presenting the one or more autocompletion options for the incomplete natural command includes displaying one or more widgets that show data previews. In some implementations, the one or more widgets are triggered based on semantics of tokens obtained from parsing the incomplete natural language command.

In some implementations, the method further includes: (i) receiving a second user input to specify a second incomplete natural language command directed to the data source; and (ii) computing and displaying updates to the data previews based on the second user input and filters used in the data visualization.

In some implementations, the method further includes: (i) storing an initial state of the data visualization, prior to receiving the second user input; (ii) receiving a third user input to specify a third incomplete natural language command directed to the data source; and (iii) in accordance with a determination that the third incomplete natural language command corresponds to a user request to reset the data visualization, reverting the data visualization based on the initial state of the data visualization.

In some implementations, the method further includes displaying, based on the relevant grammar rules, one or more autocompletion suggestions required to resolve the partially complete query to the complete natural language command.

In some implementations, presenting the one or more autocompletion options for the incomplete natural command includes: (i) detecting a user input to select the respective text instead of the respective corresponding visual graphic for the data field; and (ii) in response to detecting the user input to select the respective text, switching from displaying the respective corresponding visual graphic to displaying the respective text, wherein the respective text provides one or more text autocompletion options.

In some implementations, presenting the one or more autocompletion options for the incomplete natural command includes, in accordance with a determination that the data type corresponds to hierarchical data, providing one or more text autocompletion options for selecting hierarchy values.

In some implementations, parsing the incomplete natural language command is performed using a left-to-right (LL (*)) parser that performs a leftmost derivation of the incomplete natural language command and backtracks if a suitable parse path cannot be constructed.

In some implementations, the grammar rules correspond to a context-free grammar that includes predefined rules along with rules dynamically generated based on the data values of data fields from the underlying dataset.

In some implementations, the method further includes: (i) detecting changes in user preferences in a range of tasks during visual analysis; and (ii) correlating the one or more words in the incomplete natural language command further based on adapting autocompletion workflows to the changes for the different data types.

In accordance with some implementations, a system for generating data visualizations includes one or more processors, memory, and one or more programs stored in the memory. The programs are configured for execution by the one or more processors. The programs include instructions for performing any of the methods described herein.

In accordance with some implementations, a non-transitory computer-readable storage medium stores one or more programs configured for execution by a computer system having one or more processors and memory. The one or more programs include instructions for performing any of the methods described herein.

Thus, methods, systems, and graphical user interfaces are disclosed that enable users to analyze, prepare, and curate data.

BRIEF DESCRIPTION OF THE DRAWINGS

For a better understanding of the aforementioned systems, methods, and graphical user interfaces, as well as additional systems, methods, and graphical user interfaces that provide data visualization analytics and data preparation, reference should be made to the Description of Implementations below, in conjunction with the following drawings, in which like reference numerals refer to corresponding parts throughout the figures.

FIGS. 3A and 3B show examples of autocompletion suggestions generated as a user explores a dataset, according to some implementations.

FIG. 5A shows a design space explored by the system shown in FIG. 4A, according to some implementations.

FIG. 6B shows the design space shown in FIG. 5A after the system determined user preferences, according to some implementations.

FIGS. 9A-9L provide a flowchart of a method of utilizing data discovery to support visual analysis of datasets, according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
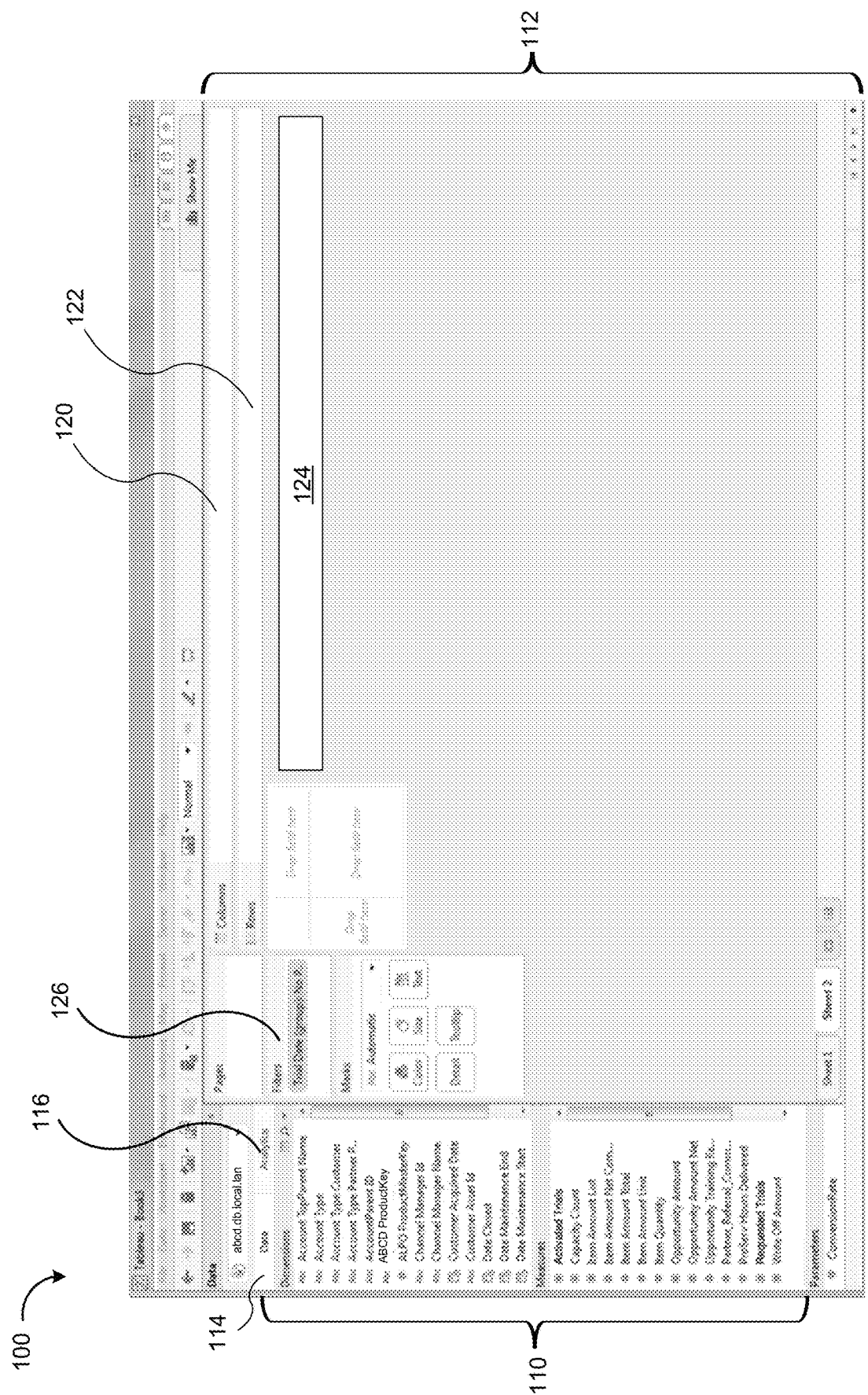
FIG. 1 illustrates an example graphical user interface for interactive data analysis, according to some implementations.

FIG. 1 illustrates an example graphical user interface 100 for interactive data analysis, according to some implementations. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets. In some implementations, the data visualization region 112 includes a region 126 for data visualization filters.

In some implementations, the graphical user interface 100 also includes a natural language input box 124 (also referred to as a command box) for receiving natural language commands. A user may interact with the command box to provide commands. For example, the user may provide a natural language command by typing the command in the box 124. In addition, the user may indirectly interact with the command box by speaking into a microphone (or an audio input device) to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language input box 124) to further explore the displayed data visualization. In some instances, a user creates the initial association using the natural language input box 124, which results in one or more data elements being placed on the column shelf 120 and on the row shelf 122. For example, the user may provide a command to view a relationship between a data element X and a data element Y. In response to receiving the command, the column shelf 120 and the row shelf 122 may be populated with the data elements (e.g., the column shelf 120 may be populated with the data element X and the row shelf 122 may be populated with the data element Y, or vice versa).

Figure 2:
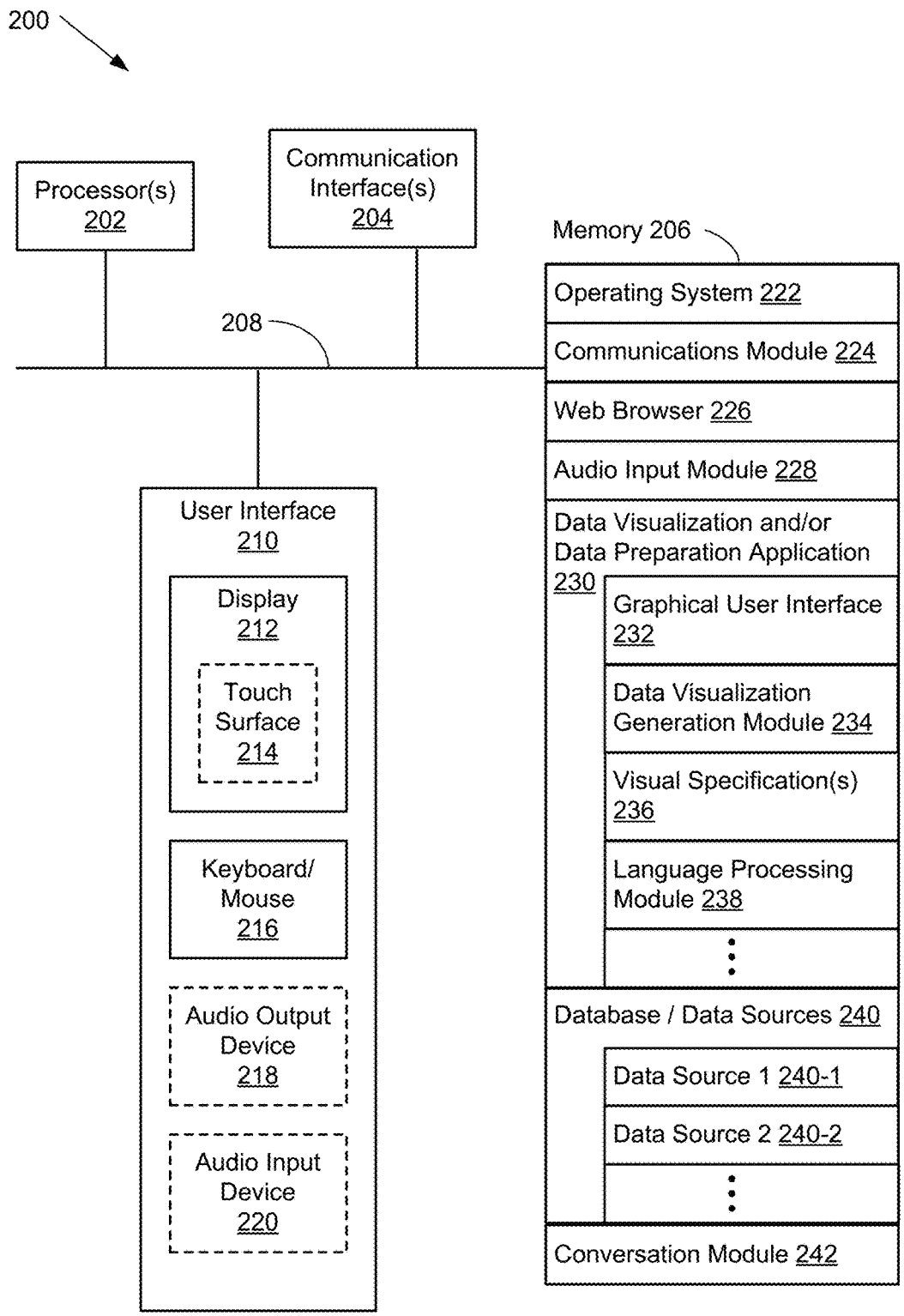
FIG. 2 is a block diagram of a computing device in accordance with some implementations.

FIG. 2 is a block diagram illustrating a computing device 200 that can display the graphical user interfaces 100 in accordance with some implementations. Various examples of the computing device 200 include a desktop computer, a laptop computer, a tablet computer, and other computing devices that have a display and a processor capable of running a data visualization application and/or a data preparation application 230. The computing device 200 typically includes one or more processing units/cores (CPUs) 202 for executing modules, programs, and/or instructions stored in the memory 206 and thereby performing processing operations; one or more network or other communications interfaces 204; memory 206; and one or more communication buses 208 for interconnecting these components. The communication buses 208 may include circuitry that interconnects and controls communications between system components.

The computing device 200 includes a user interface 210 comprising a display device 212 and one or more input devices or mechanisms. In some implementations, the input device/mechanism includes a keyboard 216. In some implementations, the input device/mechanism includes a "soft" keyboard, which is displayed as needed on the display device 208, enabling a user to "press keys" that appear on the display 208. In some implementations, the display 212 and input device/mechanism 210 comprise a touch screen display or touch surface 214 (also called a touch sensitive display). Some implementations include audio input device(s) 220 and/or audio output device(s) 218.

In some implementations, the memory 206 includes high-speed random access memory, such as DRAM, SRAM, DDR RAM or other random access solid state memory devices. In some implementations, the memory 206 includes non-volatile memory, such as one or more magnetic disk storage devices, optical disk storage devices, flash memory devices, or other non-volatile solid state storage devices. In some implementations, the memory 206 includes one or more storage devices remotely located from the CPU(s) 202. The memory 206, or alternatively the non-volatile memory devices within the memory 206, comprises a non-transitory computer readable storage medium. In some implementations, the memory 206, or the computer readable storage medium of the memory 206, stores the following programs, modules, and data structures, or a subset thereof:

- an operating system 222, which includes procedures for handling various basic system services and for performing hardware dependent tasks;
- a communications module 224, which is used for connecting the computing device 200 to other computers and devices via the one or more communication network interfaces 204 (wired or wireless) and one or more communication networks, such as the Internet, other wide area networks, local area networks, metropolitan area networks, and so on;

a web browser 226 (or other application capable of displaying web pages), which enables a user to communicate over a network with remote computers or devices;

a data visualization application and/or data preparation application 230, which provides a data visualization user interface 232 (e.g., the graphical user interface 100) for a user to construct visual graphics and/or ask natural language queries. For example, a user selects one or more data sources 240 (which may be stored on the computing device 200 or stored remotely), selects data fields from the data sources and/or searches for data fields from the data sources that match a natural language query, and uses the selected fields to define a visual graphic. In some implementations, the information the user provides is stored as a visual specification 236. The data visualization application 230 includes a data visualization generation module 234, which takes the user input (e.g., the visual specification 236), and generates a corresponding visual graphic (also referred to as a "data visualization" or a "data viz"). The data visualization application 230 then displays the generated visual graphic in the user interface 100. In some implementations, the data visualization application 230 executes as a standalone application (e.g., a desktop application). In some implementations, the data visualization application 230 executes within the web browser 226 or another application using web pages provided by a web server. In some implementations, the data visualization application 230 includes a language processing module 238 for processing (e.g., interpreting) commands provided by a user of the computing device. In some implementations, the commands are natural language commands (e.g., captured by the audio input device 220). In some implementations, an audio input module 228 processes audio input from one or more audio input devices. In some implementations, the language processing module 238 includes sub-modules such as an autocomplete module, a pragmatics module, and/or an ambiguity module. In some implementations, the memory 206 stores metrics and/or scores determined by the language processing module 238. In addition, the memory 206 may store thresholds and other criteria, which are compared against the metrics and/or scores determined by the language processing module 238. For example, the language processing module 238 may determine a relatedness metric (discussed in detail below) for an analytic word/phrase of a received command. Then, the language processing module 238 may compare the relatedness metric against a threshold stored in the memory 206;

zero or more databases or data sources 240 (e.g., a first data source 240-1 and a second data source 240-2), which are used by the data visualization application 230. In some implementations, the data sources are stored as spreadsheet files, CSV files, XML, files, or flat files, or stored in a relational database; and a conversation module 242, which processes user input, via a conversational interface (e.g., interfaces described below in reference to FIGS. 3, 7A-7W, 8A, and 8B), and generates text and/or visualization responses based on question types and/or user preferences.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

The process of information-seeking has moved away from the traditional paradigm of assuming that the information goal is well-formed; even when users are deliberately seeking information, they do not necessarily know exactly what it is they want. The translation of 'conceptual knowledge' into a searchable query begins with some vaguely-felt need of wanting to know something and gradually evolves to the point where one can describe some attribute of the desired information. Such exploratory search is a complex and cognitively demanding activity that depends on recall and sense-making.

Autocompletion is a useful mechanism for supporting this complex task, displaying in-situ suggestions as users type their queries in the flow of their search tasks. Due to its effectiveness as a scaffold for guiding searchers to be productive, autocompletion is ubiquitous in various search environments. Recently, natural language (NL) interaction in visual analysis tools has garnered interest in supporting expressive ways for users to interact with their data.

While information seeking in a visual analysis task bears similarities to other forms of search, there are differences. Visual analysis involves the need to understand the characteristics of the underlying data and the various domains included in the dataset (e.g., range and level of detail of the data fields). One of the challenges for users in the context of visual analysis tools is the cognitive load of formulating natural language queries based on their analytical inquiries.

Query reformulation is often based on the data domain being either too broad, too narrow, or ill-formulated. Users need guidance to understand whether they are finding new insights with the visualization results returned. A lack of guidance can interfere with an accurate sense of progress toward the analytical goal. Previously, autocompletion in these natural language systems has been rather basic and tends to focus on syntactic completion of search queries without any suggestions or helpful previews of the data. There is a need for autocompletion in a visual analysis context to support query formulation with data discovery to keep the user "in the loop," guiding them to make relevancy judgements.

To address this problem, some implementations use a novel interface system called Sneak Pique. A goal is to bring the fluidity of in-situ suggestions to analytical expressions typical of visual analysis tasks. Some implementations use a set of text-based and widget-based autocompletion suggestions, which provide data previews of the results before they are realized in the visualization. In some implementations, the system evaluates a user's query as it is being typed and provides data previews that are dynamically updated based on the syntactic structure of the query and the semantics of the tokens.

FIGS. 3A and 3B show examples of autocompletion suggestions 300 generated in Sneak Pique as a user explores a dataset of coronavirus cases around the world, according to some implementations. In the examples shown, a user is prompted with various autocompletion widgets, which provide appropriate previews of the underlying geospatial, temporal, and numerical data. For example, a missing token after "between" will prompt display of ranges for the user to choose from. The system also provides a mechanism to toggle from a widget to a corresponding text autocompletion dropdown as a way to drill down into hierarchical data.

FIGS. 3A and 3B show screenshots 302 and 304 of Sneak Pique with a dataset of coronavirus cases around the world, according to some implementations. As shown in the screenshot 302 in FIG. 3A, a user types the query "show me cases in" 306 and is prompted with a map autocompletion widget 310 (sometimes called a map widget) and a calendar autocompletion widget 312, providing previews of the geospatial and temporal data frequencies respectively. The user could toggle to a text autocompletion dropdown to drill down into the geospatial or temporal data. As shown in the screenshot 304 in FIG. 3B, the user then clicks on China in the map widget 310 and proceeds to find a range of cases by typing "between" 308. In some implementations, the system displays a pair of numerical range and date widgets 314 and 316, with corresponding histograms of data frequencies to help guide the user to pick a valid range based on the underlying data.

Some implementations use autocompletion as a data discovery scaffold to help users during their visual analysis workflows. In the simplest form of autocompletion, the interaction surfaces a list of precomputed text suggestions to the user. Some implementations extend that basic form to previewing a data "scent" of what a query will retrieve during visual analysis.

Some implementations explore a novel design space of autocompletion variants to better understand user preferences for (1) the display of data previews, (2) sort orders for suggestions, and/or (3) the navigation of data hierarchies during natural language interaction for visual analysis.

Some implementations use an autocompletion system (sometimes called Sneak Pique) as a design probe for implementing the various autocompletion variants from the design space. In some implementations, the system employs a look-ahead parser to support basic syntactic completion of partial queries as well as dynamically suggesting missing data values in relevant text-based and widget-based suggestions.

Some implementations use data from crowdsourced studies of the autocompletion variants to better understand user preferences and reduce the space of design possibilities for these variants. Some implementations use findings from the crowdsourced studies to inform the subset of autocompletion variants. Some implementations use insights from crowdsourced studies and/or historical usage data for design of natural language input systems for visual analysis.

Autocompletion to Support Visual Analysis

The primary goal of autocompletion is to suggest valid completions of a partial query with the intention of minimizing the time and effort for a user during a search task. There are various approaches to how autocompletion achieves this goal and can be categorized into three main categories: (1) autocompletion to support syntactic query formulation, (2) autocompletion to support information recall and preview, and (3) autocompletion to support visual analysis.

Query autocompletion (QAC) is prevalent in Web search engines, desktop search, and mobile devices where typing is laborious and error prone. QAC techniques are employed in type-ahead search by providing possible suggestions that contain input characters from the query as prefixes of keywords to match. There has also been research exploring the utility of word and phrase-level autocompletion. Systems have looked at ways to handle imprecision in search queries by developing error-tolerant QAC or fuzzy type-ahead. Ranking algorithms for generating suggestions have looked at temporal information, personalization based on search behavior, and diversification to improve user recall in search. While QAC techniques are useful for precision-oriented, fact-finding information needs, they tend to be less effective for exploratory search. There is also additional complexity as information preview changes with the context of the query tokens in play. Some implementations extend techniques developed for QAC to support data exploration that dynamically guides users while formulating syntactically correct natural language utterances.

For autocompletion to support information recall and preview, some conventional systems show recall-oriented activity through information previews. Some systems (e.g., DIALOG) keep track of query history and those queries are reused by reference. Some systems (e.g., VOIR) display the retrieval history of documents using histograms of rank information. Some systems (e.g., Ariadne) generate a visual representation of a search trajectory to review earlier actions. Some systems (e.g., NRT) implement a history mechanism of recorded previously-run queries, making it possible for the searcher to scan the results list visually for new documents. Some systems employ a search interface of a data schema showing the number of records for each possible suggested attribute. Some systems (e.g., AutoG) show possible graphs when the user draws a partial query graph. Some systems show a query preview widget that provides a visual summary of the results before the query was executed. Such systems orient users in the result page by marking visited content and highlighting changes in the search documents. Such conventional systems focus primarily on document search goals, which are different from visual analysis tasks.

Conventional natural language interfaces for data visualization provide limited text autocompletion without any preview of the underlying data. Other interfaces support query reformulation where input utterances are translated into their corresponding canonical forms that represent the underlying system's language. Some conventional systems use graphical user interface controls called "scented widgets," which can support data analysis tasks. Such systems enhance traditional visual widgets like sliders, combo boxes, and radio buttons with additional embedded visualizations to facilitate navigation in information spaces. On the other hand, the Sneak Pique system described herein can be used as a design probe to examine how both textual and visual variants of autocompletion with data previews provide users guidance within the context of natural language interaction for visual analysis tasks.

Sneak Pique System

Figure 4A:
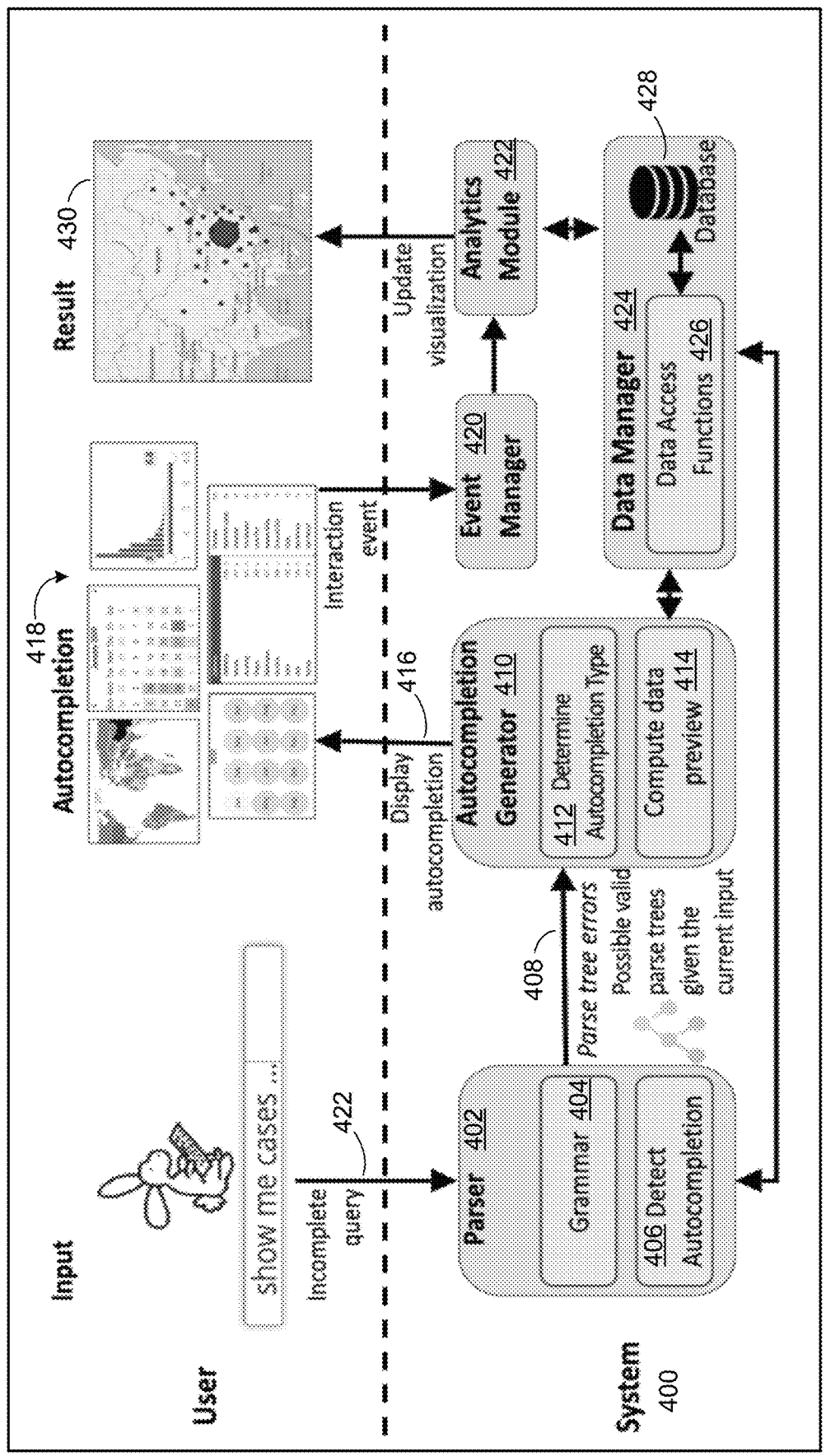
FIG. 4A is a schematic diagram of a system that uses autocompletion as a data discovery scaffold, according to some implementations.

Some implementations use a system called Sneak Pique, which provides autocompletion suggestions with data preview information in a natural language interface during visual analysis exploration. FIG. 4A illustrates Sneak Pique's system architecture 400, according to some implementations. In some implementations, the system architecture 400 is implemented as one or more modules in the memory 206 of the device 200 described above in reference to FIG. 2. According to some implementations, the system employs a web-based client-server architecture. In some implementations, an input query 422 (sometimes called an incomplete natural language command, an incomplete query, or a query) is processed by a parser 402 (e.g., an ANTLR parser) using a grammar 404 (e.g., a context-free grammar) containing predefined rules as well as rules dynamically added based on the data values of data fields from the underlying dataset. In some implementations, the parser 402 accesses the underlying dataset (e.g., data from the database 428) through a Data Manager 424, which has access functions 426 to handle data requests. In some implementations, an Autocompletion Detection module 406 polls the query 422 as the user is typing and triggers (408) grammar parse tree errors when the query is partially complete. In some implementations, the parse tree errors are passed to an Autocompletion Generator 410, which introspects on the syntactic structure of the partial query along with the relevant grammar rules that would be satisfied if the query were complete. The generator 410 determines (412) autocompletion types required to resolve the partial query into a complete one. With the help of the Data Manager 424, in some implementations, the generator 410 computes (414) necessary data preview information that would be displayed (416) in the autocompletion suggestion. In some implementations, the autocompletion suggestion is then rendered and displayed (e.g., visualizations 418) in the user interface of the client. Any interaction that the user performs with these autocompletion suggestions is captured by an Event Manager 420. In some implementations, the system updates the visualization result 430 through an Analytics Module 422, based on executing the autocompleted query.

Autocompletion Detection

In some implementations, Sneak Pique employs a left-to-right LL(*) parser, performing a leftmost derivation of the input search query. An LL(*) parser is used for generating autocompletion suggestions as this class of parsers can gracefully throttle up from conventional fixed k≥1 token look-ahead to arbitrary look-ahead and is able to backtrack if a suitable parse path cannot be constructed. In some implementations, the input to the parser is a grammar augmented with predicates having corresponding look-ahead actions to trigger events being sent to a Suggestion Module. In some implementations, each grammar rule encapsulates an analytical intent, similar to other natural language visual analysis grammar systems. The rules are composed of lexicons that are either static (i.e., predefined in the grammar) or dynamic (i.e., computed from the data values of data fields in the database in real-time). In linguistics, a lexicon is a vocabulary of words and phrases that have known semantic meaning. In some implementations, the parser converts the input grammar to an equivalent augmented transition network (ATN), an efficient graph representation for grammars used in parsing relatively complex natural language queries. In some implementations, the state model is computed using a flow analysis that traces the ATN graph representation through all nodes reachable from the top-level node. Given a grammar $G=(N, T, P, S, \Pi, \mu)$, the ATN state machine, $A_G=(Q, \Sigma, \Lambda, E, F)$ has the five elements: (1) $Q$ is the set of states, (ii) $\Sigma$ is the set of tokens $N \cup T \cup \Pi \cup$ , $\mu$, (iii) $\Lambda$ is the transition relation mapping $Q \times (\Sigma \cup \varepsilon) \rightarrow Q$, (iv) $E=p_A$, where $A \in N$ is the set of entry states, and (v) $F=p'_A$, where $A \in N$ is the set of final states.

$A_G$ is computed for each nonterminal lexical element from the grammar, creating a state model for each $\Sigma$, according to some implementations. The nonterminal symbols form the syntactic structure of the parse and are replaced by terminal symbols, i.e., the leaf nodes in the parse tree. Nonterminal edges $p \rightarrow p'$ are function calls based on $\Lambda$ that push the return state $p'$ onto a parse state stack so it can continue from $p'$ after reaching the stop state for the state flow. In some implementations, the parser simulates actions in the ATN to predict the next tokens in Q and computes a look-ahead parse tree. Prediction errors occur in the ATN when a sequence does not resolve to a corresponding grammar production rule for the current nonterminal. The LL(*) prediction state model reports an error at the specific token and scans ahead to determine if there are any nonterminals that can resolve the error. For autocompletion to trigger, the shortest look-ahead sequences are identified that would generate valid parse trees, according to some implementations. In some implementations, the autocompletion detection algorithm is generalized for both static and dynamic lexicons.

In some implementations, the system 400 includes a look-ahead parser 402, which includes a grammar 404, and an autocompletion detection module 406, which reviews a query (e.g., an incomplete query 422) as it is typed or input by a user. The parser 402 parses the query and generates parse tree errors 408 and/or possible parse trees for the input, when the input query is incomplete. An autocompletion generator module 410 determines (412) autocompletion types to resolve the partial/incomplete query, based on the parse tree errors 408. With the help of the data manager 424, the generator 410 computes (414) preview data and updates the autocompletion suggestion with data frequency information. The autocompletion suggestion is displayed (416) in a user interface (e.g., the visualizations 418). A user can interact with the autocompletion and update the query to create a visualization response 430.

Figure 4B:
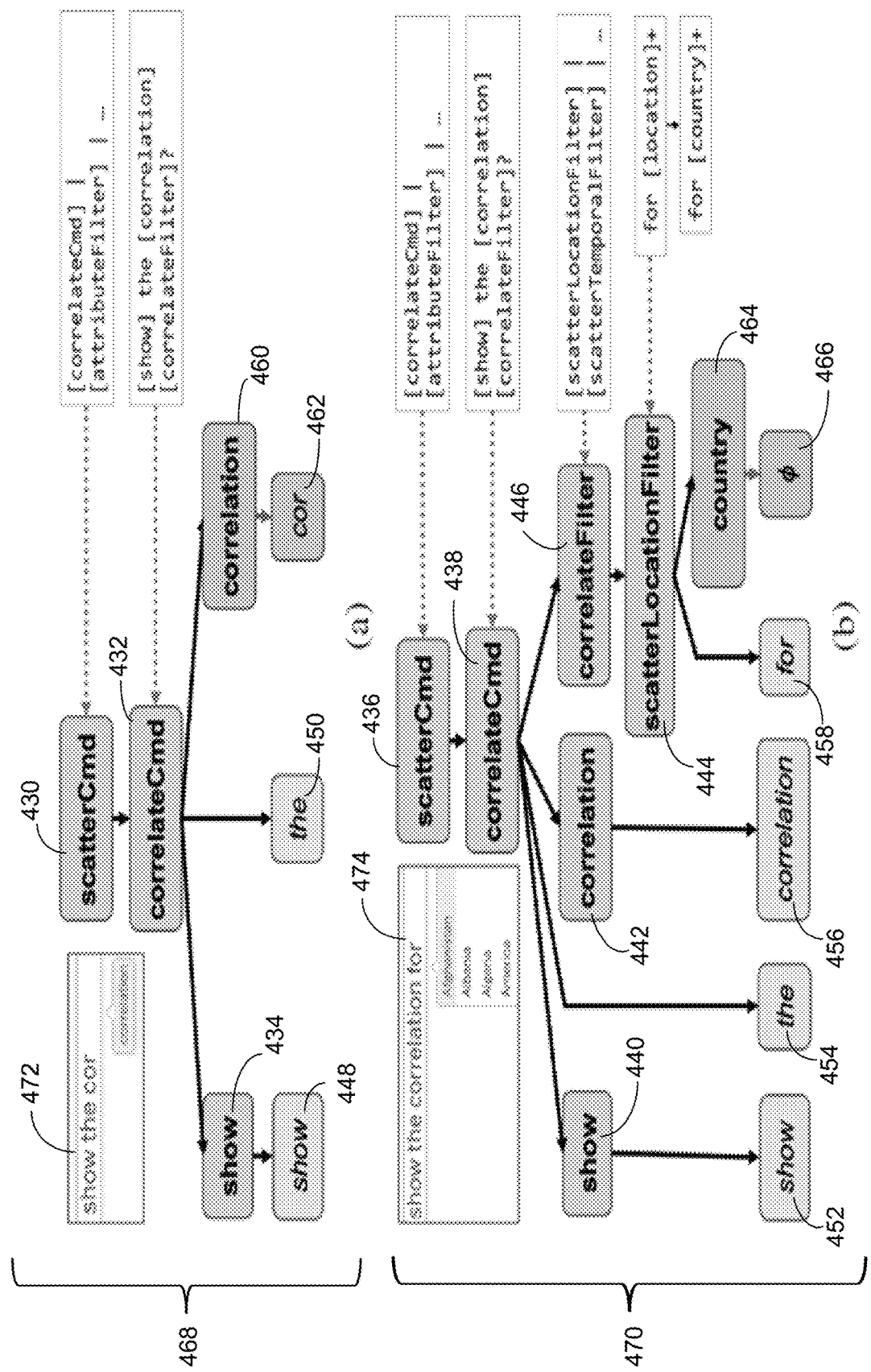
FIG. 4B shows an example where a parser computes look-ahead parse trees and predicts tokens for triggering autocompletion, according to some implementations.

FIG. 4B shows an example where the parser 402 computes look-ahead parse trees and predicts tokens for triggering autocompletion, according to some implementations. The green nodes 430, 432, 434, 436, 438, 440, 442, 444, and 446 depict grammar rules, the orange nodes 448, 450, 452, 454, 456, and 458 depict lexicons, and the red nodes 460, 462, 464, and 466 indicate parser errors. As shown in the top portion 468 of FIG. 4B (labeled (a)), autocompletion suggests 'correlation' 460 to generate a valid parse for "show the cor" 472. For this example, the query "show the cor" 472 generates a parser error at the nonterminal node cor 462 as the token does not match any grammar production rule. The parser computes a look-ahead to find the static lexicon correlation. In the bottom portion 470 of FIG. 4B (labeled (b)), the user continues typing, based on the underlying data semantics, countries from the location data are suggested for "show the correlation for" 474. The input "show the correlation for" 474 results in an error 466 further down in the parse tree as the query is missing a country name, which is a dynamically generated lexicon from the dataset. Parse tree error information provides input to the Autocompletion Generator for rendering the suggestions.

Autocompletion Generation

After detecting when to trigger autocompletion in the parsing process, some implementations determine how the autocompletion suggestions should be presented in the interface. One of the key guiding principles for designing autocompletion interfaces is recognition over recall: the notion that people are better at recognizing things they have previously experienced than they are at recalling them from memory. Autocompletion also helps with information discovery with unfamiliar data, providing guidance when no recall exists.

Design Patterns for Autocompletion

Some implementations use the following design patterns for autocompletion suggestions in Sneak Pique:

- Provide suggestions in context of the partial search query. In some implementations, autocompletion assists users when searching by presenting items that match the users input as they type. As the user types in more text into the search field, the list of matching items is narrowed down.
- Sort order. In some implementations, autocompletion sorts items with the most relevant or likely match at the top of the list. This allows the user to quickly select the match.
- Semantic grouping. In some implementations, autocompletion groups similar items into categories for easy scan and lookup.
- Reduce visual noise. In some implementations, autocompletion avoids cognitive overload by displaying information only as a preview, not as a final result.
- Manageable list. In some implementations, autocompletion limits the number of matching items to display, especially when working with a large number of data values.
- Lightweight interactivity. In some implementations, autocompletion supports lightweight interaction allowing users to select a suggested item, saving time and keystrokes. Autocompletion also remains unobtrusive so that users can still type in a complete query if they choose to.

Determination of Autocompletion Type

Some implementations combine autocompletion design patterns with best practices for information visualization display. Some implementations use various text and widget-based autocompletion representations. Using Sneak Pique as a design probe, some systems implement autocompletion variants based on the data type of the missing dynamic lexicon in the input query. To explore the utility of displaying the data preview, some implementations generate these variants with and without data frequency numbers that indicate how often the values occur in the dataset. Some implementations also generate various sort orders based on the data type.

FIG. 5A shows an example design space 500 for autocompletion, according to some implementations. Each row shows various text and widget-based representations by data type. Data Preview (DP) variants display data frequency numbers of the values. FIG. 5A depicts the following set of variants:

- Categorical (row 1, labeled 502): A text list (e.g., lists 512, 514, and 516) or a bar chart (e.g., bar charts 518, 520, 522, and 524) shows suggestions for a categorical data field with various sort orders (e.g., the list 514 is sorted alphabetically, whereas the list 516 is sorted numerically by frequency). If a data preview is present (marked 'DP'), numbers are displayed in the list or encoded as bar lengths. Categorical data is typically stored as character strings representing discrete values, such as products that a company sells.
- Numeric (row 2, labeled 504): Text widget (e.g., widget 526) or a slider widget (e.g., widget 528) shows the data value range for a data field. A variant of the slider widget (e.g., the widget 530) shows a histogram to encode data frequency.
- Geospatial (row 3, labeled 506): A list widget (e.g., widgets 532, 534, and 536) or a map chart widget (e.g., widgets 538, 540, and 542) show location values. If a data preview is present, numbers are displayed in the list or as a visual encoding (i.e., color, size) on the map. For hierarchical data, a nested listed view or map widget is provided to drill-down (e.g. from country to city). The displayed numbers (when present) are the data values for a data field in the database. In these examples, the displayed numbers (or encoded numbers) represent the total number of coronavirus cases in each geographic location.
- Temporal (row 4, labeled 508): A list widget (e.g., widgets 544, 546, and 548) or a calendar widget (e.g., widgets 550, 552, 554, and 556) shows time and/or time values. If a data preview is present, the information is displayed numerically in the list or as color encodings in the calendar. Based on temporal intent, the calendar widget defaults to the appropriate level of detail. For example, "cases on" shows a calendar widget with a date view while "cases in" shows the month view. For a temporal range, the system displays a slider. The numbers represent data for a data field storing total coronavirus cases.
- Semantic grouping (row 5, labeled 510): In natural language systems, geospatial and temporal intent can be ambiguous. For example, the query "show earthquakes in" could indicate either a missing location or time. Some implementations address this ambiguity by semantically grouping geospatial and temporal values in the autocompletion suggestions as a text list (e.g., lists 558 and 560) or as a combination of map and calendar widgets (e.g., widgets 562 and 564).

Some implementations employ an Equal Area projection that tends to be conducive for click interaction in a small display area. Hierarchical data is a tree structure representation of data records.

In some implementations, the system also provides partial text matches to dynamic data values and static analytic concepts. For example, when the user types "ma," the system shows matched suggestions for both "Massachusetts" and "maximum."

Figure 5B:
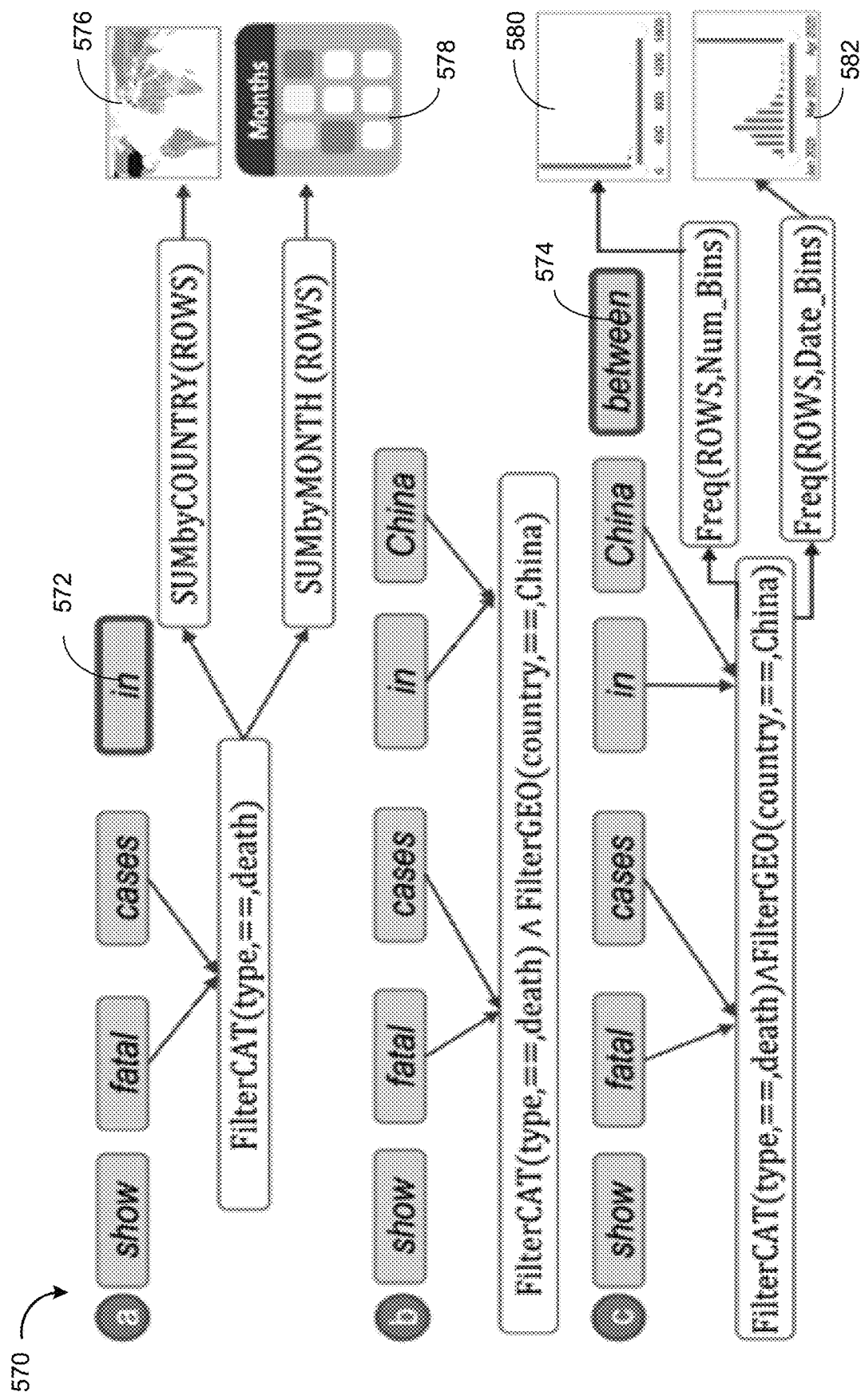
FIG. 5B shows an example of data preview computation, according to some implementations.

FIG. 5B shows an example of a data preview computation 570 in Sneak Pique, according to some implementations. Widgets with data previews are triggered after the nodes 572 and 574 (highlighted in red). As shown in (a), the user starts with a query "show fatal cases in," which displays map and calendar widgets (e.g., the widgets 576 and 578). In the background, the system applies a filter to select only death cases and then applies appropriate aggregation methods to show the sum of cases as data previews in the widgets. Next, as shown in (b), the user clicks on China in the map widget 576 resulting in a complete query. When the user adds "between," as shown in (c), the system predicts ranges for China in the numeric and temporal widgets (e.g., the widgets 580 and 582).

Compute Data Preview

In some implementations, the system computes the data frequency for the data values of data fields associated with the predicted dynamic tokens, and displays the information. In some implementations, the data preview generation dynamically updates the data preview results based on the context of the current query. The system applies appropriate aggregate and filter analytical functions. FIG. 5B illustrates this process, according to some implementations. Given the query "show fatal cases in," the system executes the analytical function FilterCAT(caseType, ═, death), applying a filter on "death." The sum of cases is aggregated by country in the map widget and by month in the calendar widget.

In some implementations, before generating data previews, the system checks for the presence of data fields in the query to prevent duplicates from being added when interacting with the autocompletion widgets. As shown in FIG. 5B (part (c)), for the query "show me fatal cases in China between," the system applies FilterCAT(caseType, ==, death) and FilterGEO(country, ==, China), but does not present either of these options as an autocomplete suggestion.

Evaluating Autocompletion Variants

There are currently no standard guidelines for the appropriate way to show autocompletion suggestions specifically designed for visual analysis. It is unclear what user preferences are for each of these autocompletion variants and how those preferences vary based on data type, sort order, or actual representation. Some implementations probe some of these characteristics of what an appropriate autocompletion suggestion would look like for formulating sensible defaults in a visual analysis natural language interface. Some implementations do not use objective measures in terms of speed or accuracy, since what is pertinent is user preferences as to the most appropriate autocompletion variant. Typically, most users agree, in certain conditions, on a set of reliable design guidelines.

Figure 6A:
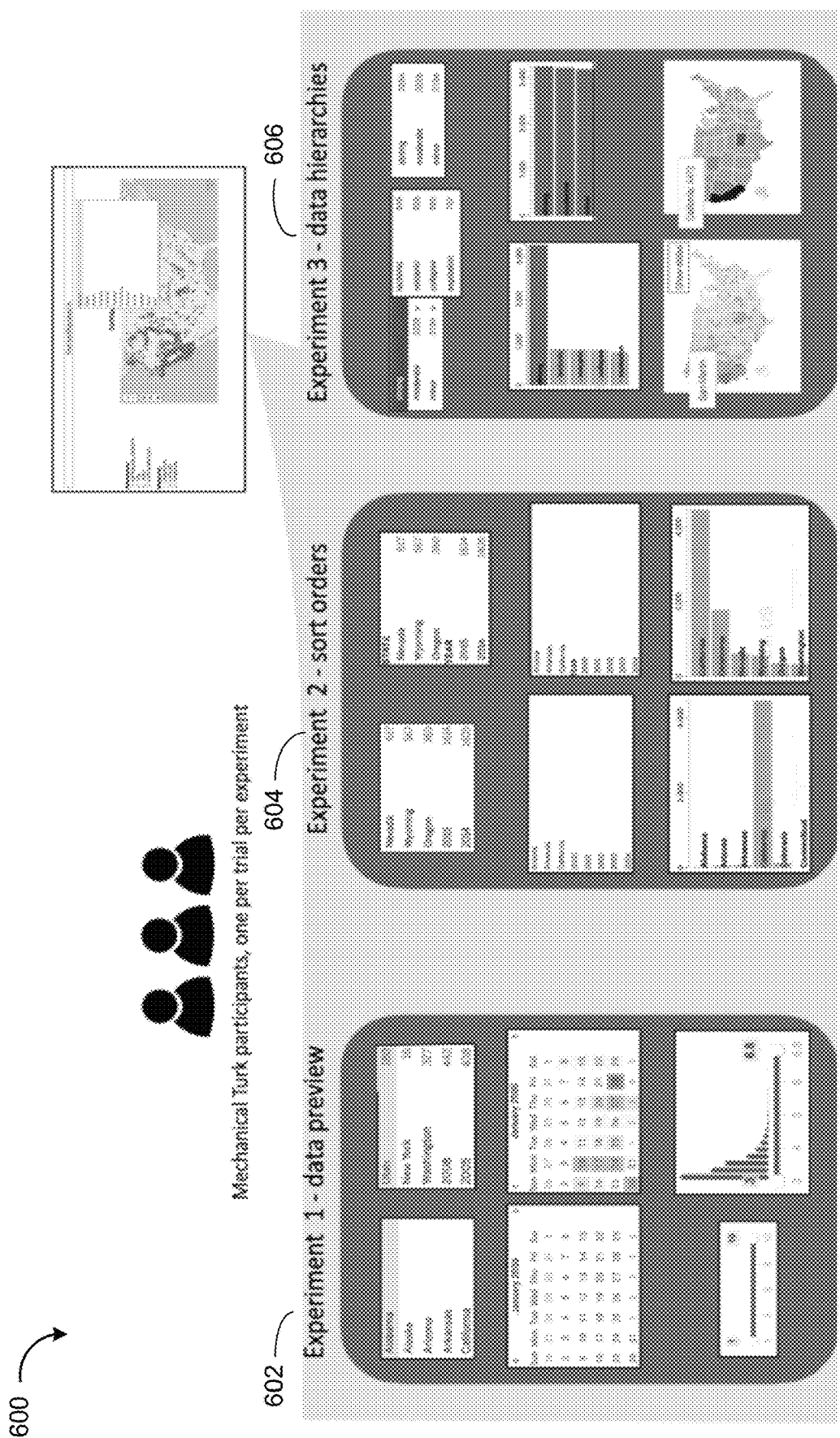
FIG. 6A shows various mechanical turk experiments performed using the system shown in FIG. 4A to identify a subset of autocompletion variants, according to some implementations.

Some implementations use several experiments to identify user preferences for the various factors that influence the choice for autocompletion suggestions. FIG. 6A shows various mechanical turk experiments 600 performed using the system to identify a subset of autocompletion variants, according to some implementations. A first experiment 602 compares autocompletion variants with and without data frequencies displayed. A second experiment 604 analyzes sort order preferences. A third experiment 606 analyzes user preferences for navigating hierarchical data. To further illustrate, in some implementations, for example, a first experiment compares autocompletion variants with and without data frequency information displayed to understand if such data previews are useful to the user. A second experiment examines the type of sort order that would be useful to apply to items shown in text autocompletion suggestions. And, a third experiment compares autocompletion variants that display data values with and without hierarchies to better understand whether hierarchical data should be suggested to the user and in what form. Some experiments use a different set of stimuli than those shown in FIG. 6A.

In some instances, participants find data preview information to be useful across all autocompletion variants. In some instances, participants prefer items sorted in descending order of their data frequencies as more prevalent data values should show up higher in the suggestions. For temporal items, users prefer chronological order. In some instances, hierarchical text suggestions is easier to navigate than widgets. However, participants find the calendar widget helpful for navigating temporal hierarchies.

Example Experiment Design

For each of the experiments, participants were recruited from Amazon Mechanical Turk, a crowdsourcing platform prevalent in much contemporary research. Participants were English speakers in the U.S. with at least a 95% acceptance rate and 500 approved tasks. The stimuli did not require excluding participants for color deficiencies. Participants could complete only one trial to avoid biases that might arise from repeated exposure to the task. The experiments used an earthquakes dataset with magnitudes by location and time in the U.S. as this is likely to be understandable to a broad population. The experimental procedure was:

Training task: A chart shows a scatterplot of the relationship between life expectancies and income for various countries with practice questions to ensure understanding of autocompletion suggestions.

Presentation of the overall task description and instructions.

Actual task: A new page showing a search box with the utterance, "find earthquakes [in/between] . . . " The participant is shown two image autocompletion choices in randomized order asking the participant to pick their top preferred choice. A freeform text response box is provided to explain preferences.

Due to space constraints, in some experiments, only a sample set of stimuli for each experiment is shown to users.

Results of Experiments

Overall, participants were positive about the autocompletion interaction and identified many benefits. Sneak Pique allowed participants to introspect on the data as they were typing ("This is cool . . . provides me a way to see what I will get while I am typing my question" [P'1]), helped them proactively discover what was in the data ("By typing, I can already filter to a specific country and see what's in there without having to see the result and try again . . . I don't have to shoot darts in the dark" [P'4]), and could save time ("I could finish the tasks really fast as the autocompletion guided me to see where to look." [P'7]). In the description above, P'X indicates participant IDs in these study results to distinguish from those in the Mechanical Turk studies.

Part 1—Target Criteria Tasks

Six out of the eight participants were able to complete all tasks successfully. Tasks were easier to complete when the data frequency information encoded in the autocompletion widgets was visually discernible. One participant struggled when trying to visually compare countries or months when picking values with either a high or low incidence of coronavirus cases. Another participant had difficulty accessing hierarchical data in the Sneak Pique interface.

Part 2—Open-Ended Tasks

The open-ended task demonstrated how autocompletion was helpful for data discovery while users typed their queries. Participants surfaced autocompletion for both syntactic query completion and for completing filter expressions by place, time, and range. The number of individual queries per participant ranged from 8 to 23 ($\mu=11.3$) with 46% of them being reformulations of previously typed queries by editing in place. Overall, a good number of partial queries used autocompletion with data previews to help resolve into complete ones (69%). Usage of widgets was roughly split evenly across calendar (34%), slider (33%), and map (29%) widgets. The rest was text autocompletion for accessing hierarchical data. Comments relevant to this behavior included, "That was convenient to type to an extent and rely on the calendar to go to a specific date that was interesting. I hate typing dates" [P'4] and "Getting a range right is a hit or miss for me. Helpful to see where most of the data is and pick with slider" [P'1]. Participants directly typed the natural language query for specific fact-finding questions, such as "show me the cases in New York last month" and "highest cases in India," with 33% of the total number of queries belonging to this category.

This experimental evaluation of sneak Pique confirmed the intuition that users find data previews useful in autocompletion while performing visual analysis. Results suggest that participants put more thought into the search terms when the preview was present; they were engaged in more sense-making behavior both during query construction and when examining the search results. Observations from the study provide the following design implications for how autocompletion can help with visual analysis tasks, opening new opportunities for future research:

Autocompletion for varied visual analysis workflows: An effect of task intervention during the first part of the study was that there were fewer query reformulations as participants utilized data previews to complete the tasks. The second part of the experiments was more representative of real world practice: users changed tactics when formulating their queries. Participants used the data previews as a scaffold to construct compound queries where multiple filters were incrementally updated in the original query. P'2 said, "I find it convenient to pile more filters in my question as the views in the autocompletion get updated . . . saves me time when I'm playing around." During data exploration, participants would remove or clear these filter subexpressions if the data previews were not interesting anymore. For direct fact-finding questions, participants would type the question directly without the need for data previews. However, the text autocompletion helped guide them while typing the tokens. These observations indicate that autocompletion is used in different ways based on the type of inquiry. In some implementations, autocompletion workflows adapt to a range of tasks during visual analysis.

Support for More Complex Previews

As described above, Sneak Pique enables some basic analytical functions (e.g., filters and aggregation) with data previews. In some implementations, this functionality is extended to make complex analytics accessible to people with limited knowledge of statistics. For example, P'3 commented, "I want to type 'show me cases with declining trends . . .' and get a widget showing me the countries where the cases were going down so I can decide where to look." For queries that have both geospatial and temporal intents, such as "coronavirus cases in," participants expected the map and calendar widgets to be coordinated and expected that clicking on a country in the map would update its corresponding time preview in the calendar widget (and vice-versa). Some implementations use the data previews to indicate the system's understanding of semantic concepts, such as highlighting California, Oregon and Washington in the map widget for "cases in the west coast" or multi-selection in the widgets for supporting how people think about search in space. Some implementations balance interaction simplicity with more complex previews to serve a greater gamut of analytical questions. Some implementations balance adding functionality into the autocompletion itself versus letting the user explore the results in the visualization. In some implementations, the autocompletion behavior is designed to be performant to support real-time interaction.

Showing Provenance of Autocompletion Behavior

While most of the participants understood the purpose of the data previews, they described usability issues around understanding autocompletion behavior based on what was in context in the queries. When one or more filters are in play, the data previews are dynamically updated to reflect the data domain in context. The behavior was not always intuitive and either required clarification by the experimenter or the participant would eventually figure out the functionality after attempting to select a disabled item in the widget. P'7 stated—"It would be good if I can see a message appearing saying that I am already looking at April and the data in the autocompletion is for that month." While the dynamic generation of autocompletion suggestions helps provide in-situ guidance to the user, some implementations actively show this feedback in the interface to set appropriate user expectations.

Personalization of Autocompletion Suggestions

The topic of personalization of autocompletion behavior came up during the exploratory study. P'3, P'4, and P'8 expressed that they wanted the autocompletion to keep track of their past interaction and update the default views. For example, P'4 said "I am interested in the days and not months as these coronavirus cases are changing so much. I don't want to keep switching from month to day view every time." Some implementations monitor user interaction with Sneak Pique, record user queries, and update autocompletion preferences.

Autocompletion is a useful interaction paradigm for information sense-making. As described above, Sneak Pique is a design probe to explore the space of autocompletion in the context of visual analysis and data discovery. According to some implementations, as described above in reference to FIGS. 4A and 4B, the system uses an efficient look-ahead parser to resolve static tokens as well as dynamic data values for text and widget autocompletion variants. User study results showed that data previews are indeed useful and informed how such information could be usefully presented in the interface. Some implementations use a subset of preferred autocompletion variants in the final implementation. In this way, autocompletion can serve as a data scaffold to help users make relevance judgments for visual analysis tasks. Some implementations strike a balance between light-weight interactivity and rich analytical previews.

Figure 6B:
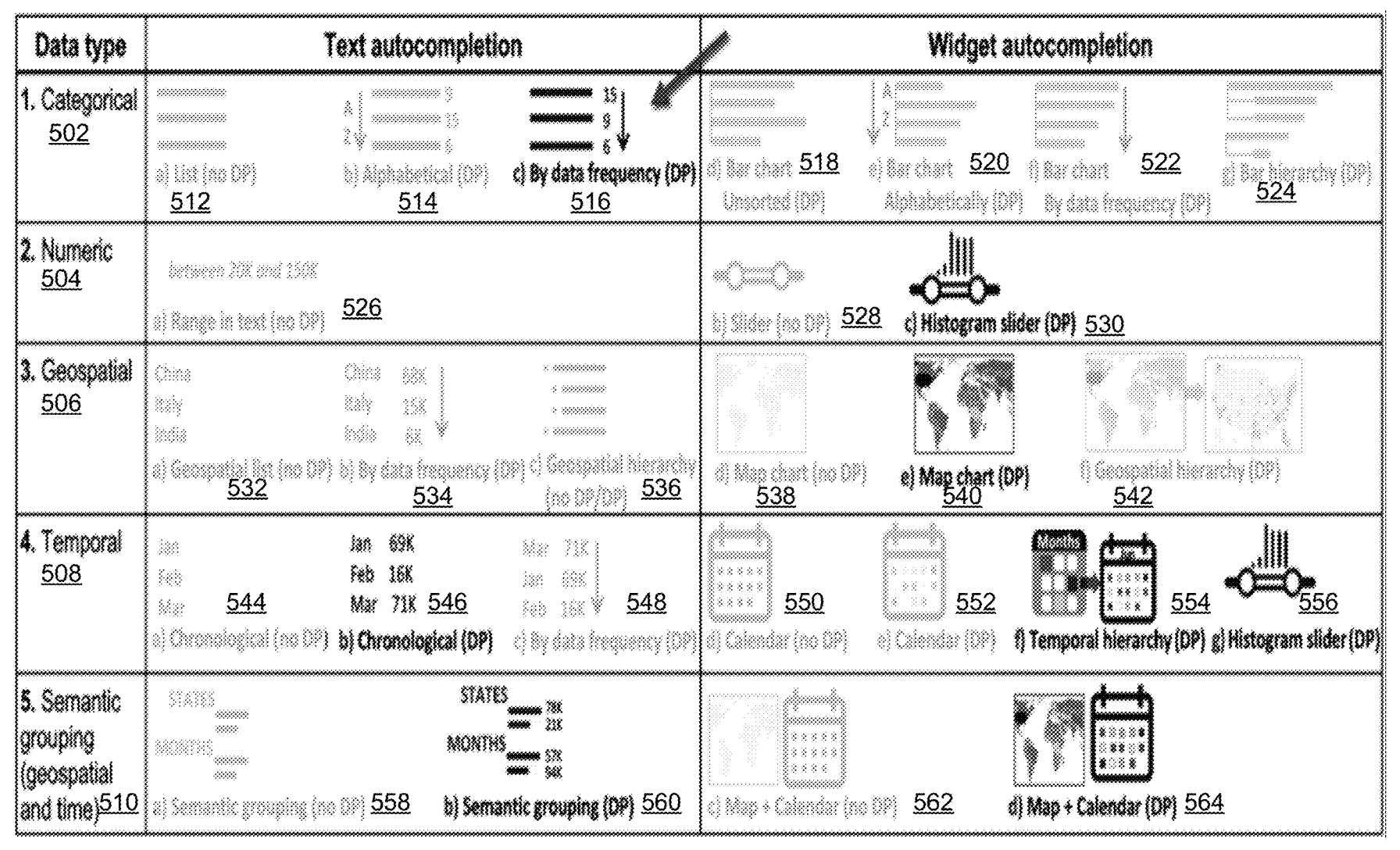

FIG. 6B shows the design space shown in FIG. 5A after the system determined that data frequencies are useful to show (to the user), according to some implementations. Participants preferred sorting categorical data by data frequency (e.g., the list 516), and chronological ordering for time (or temporal) data (e.g., the widget 546). Participants also preferred maps (e.g., the widget 540) and histogram slider (e.g., the widget 530) for geo-spatial data and numeric ranges, respectively. Participants also preferred text autocompletion with semantic grouping (e.g., the widget 560) for displaying hierarchical data. Participants also preferred calendar widget (e.g., the widget 554) for navigating temporal data. Maps and calendar widgets were shown together for completing queries with time and place values. Some implementations use the results obtained from these experiments to determine preferred or default variants for different types of data.

Figure 7A:
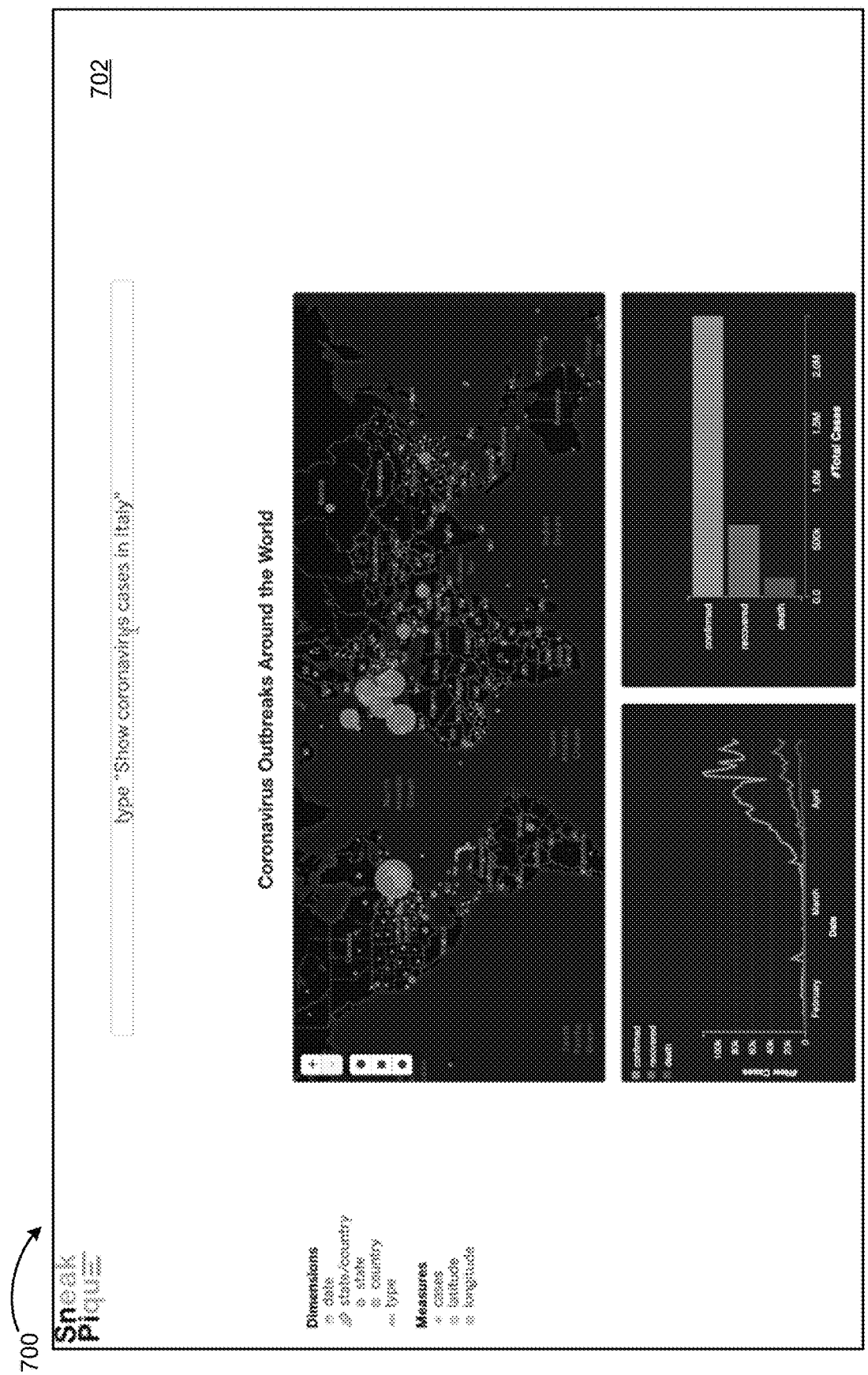
FIGS. 7A-7W show updates to an example dashboard, according to some implementations.
Figure 7B:
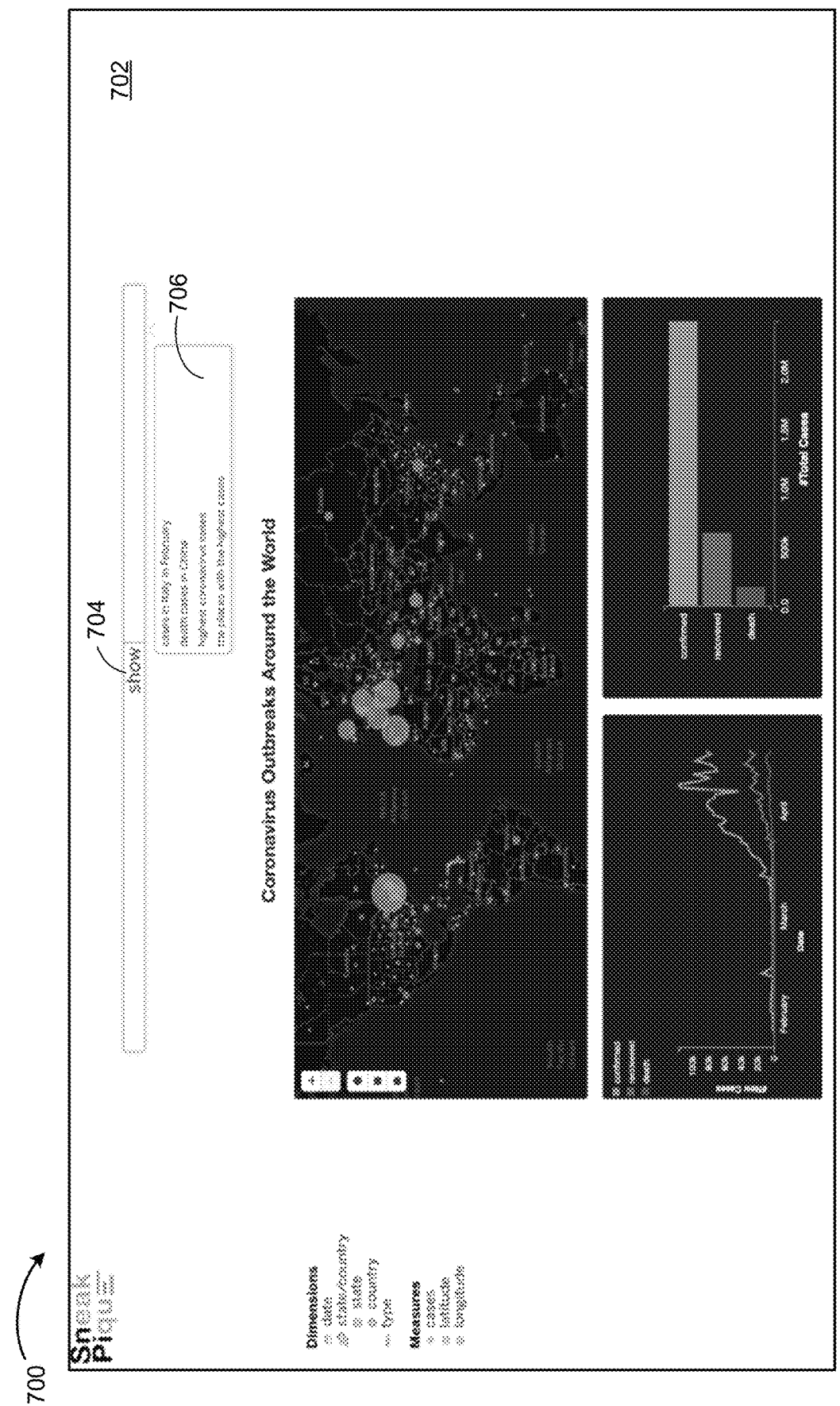
Figure 7C:
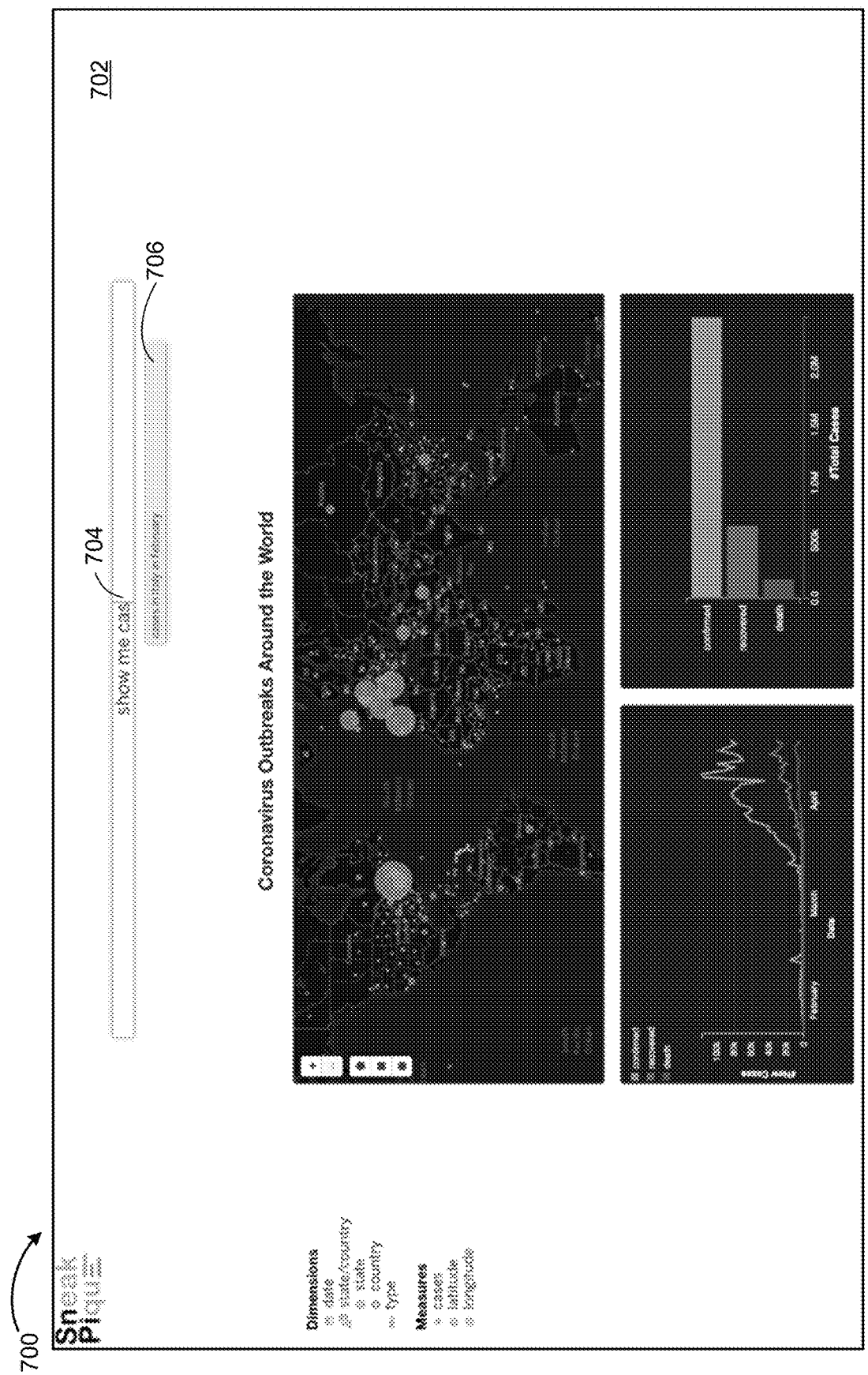
Figure 7D:
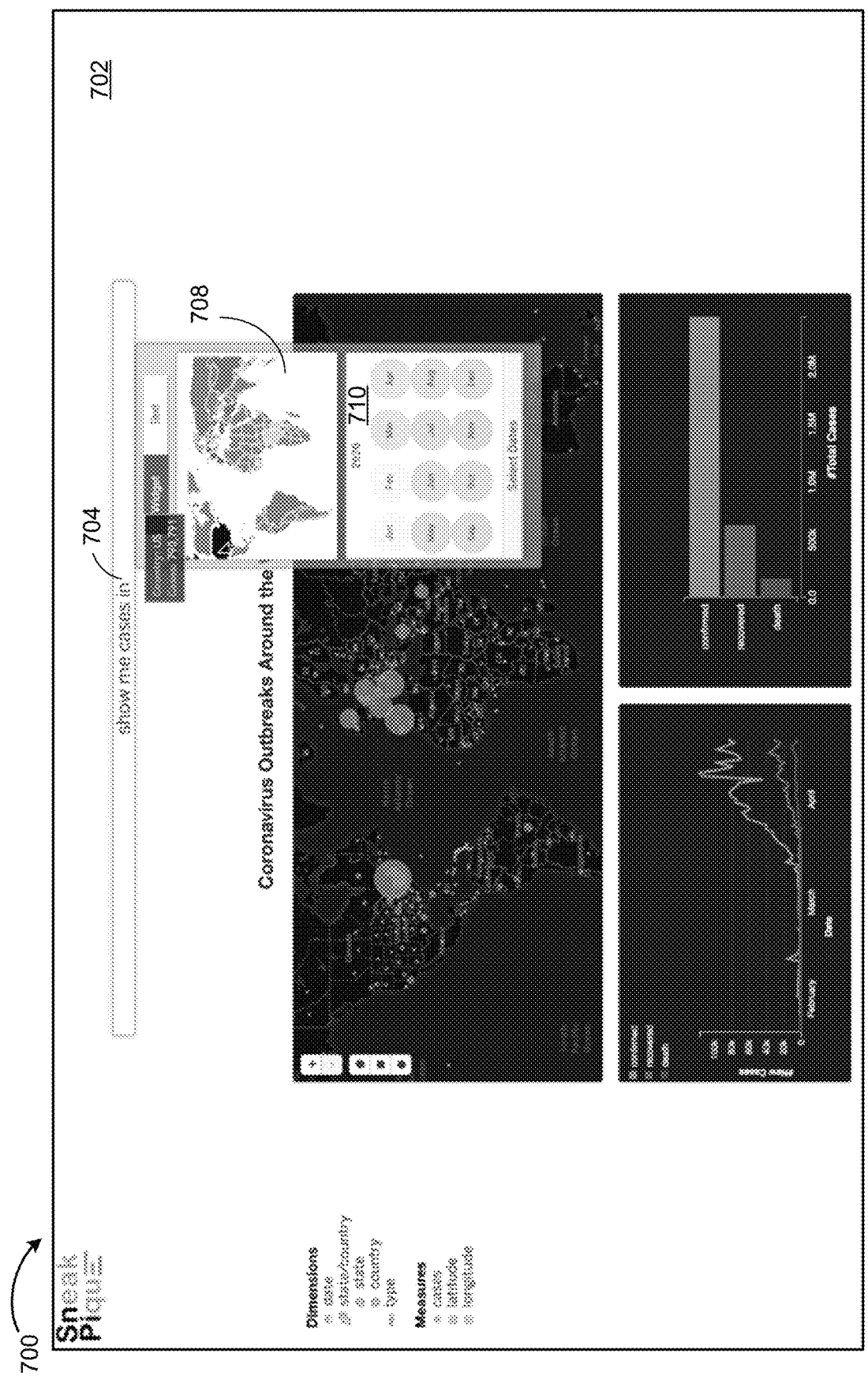
Figure 7E:
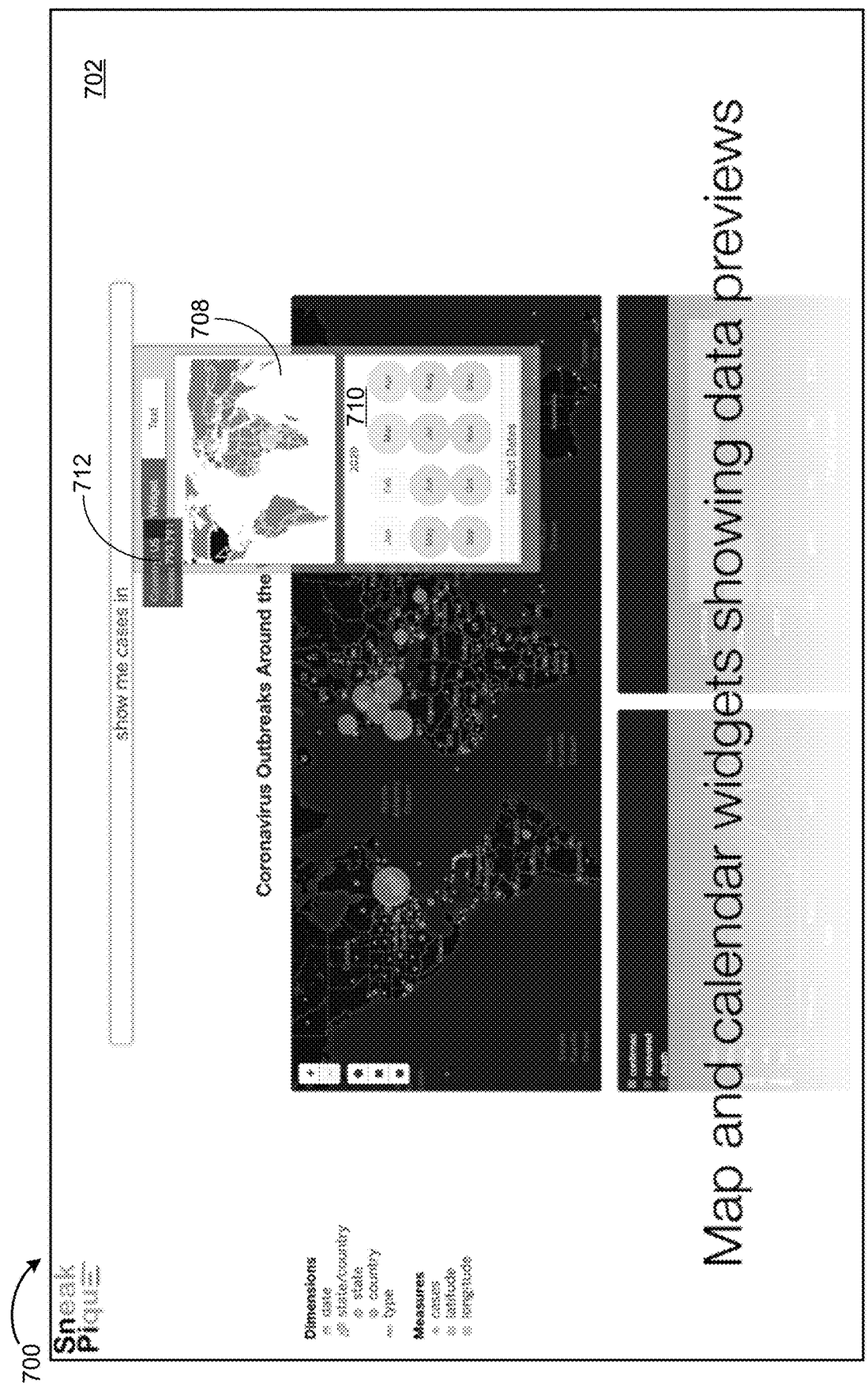
Figure 7F:
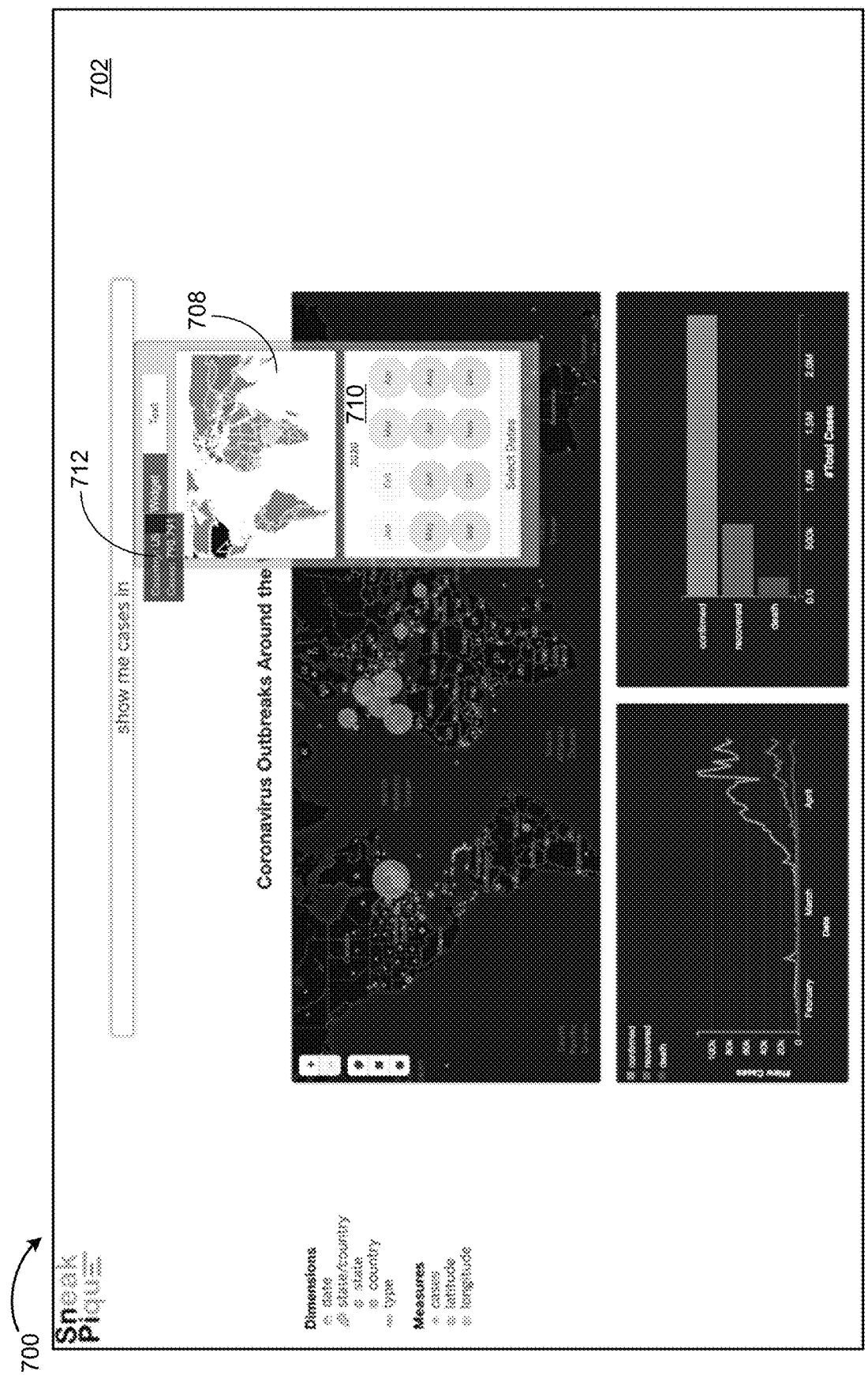
Figure 7G:
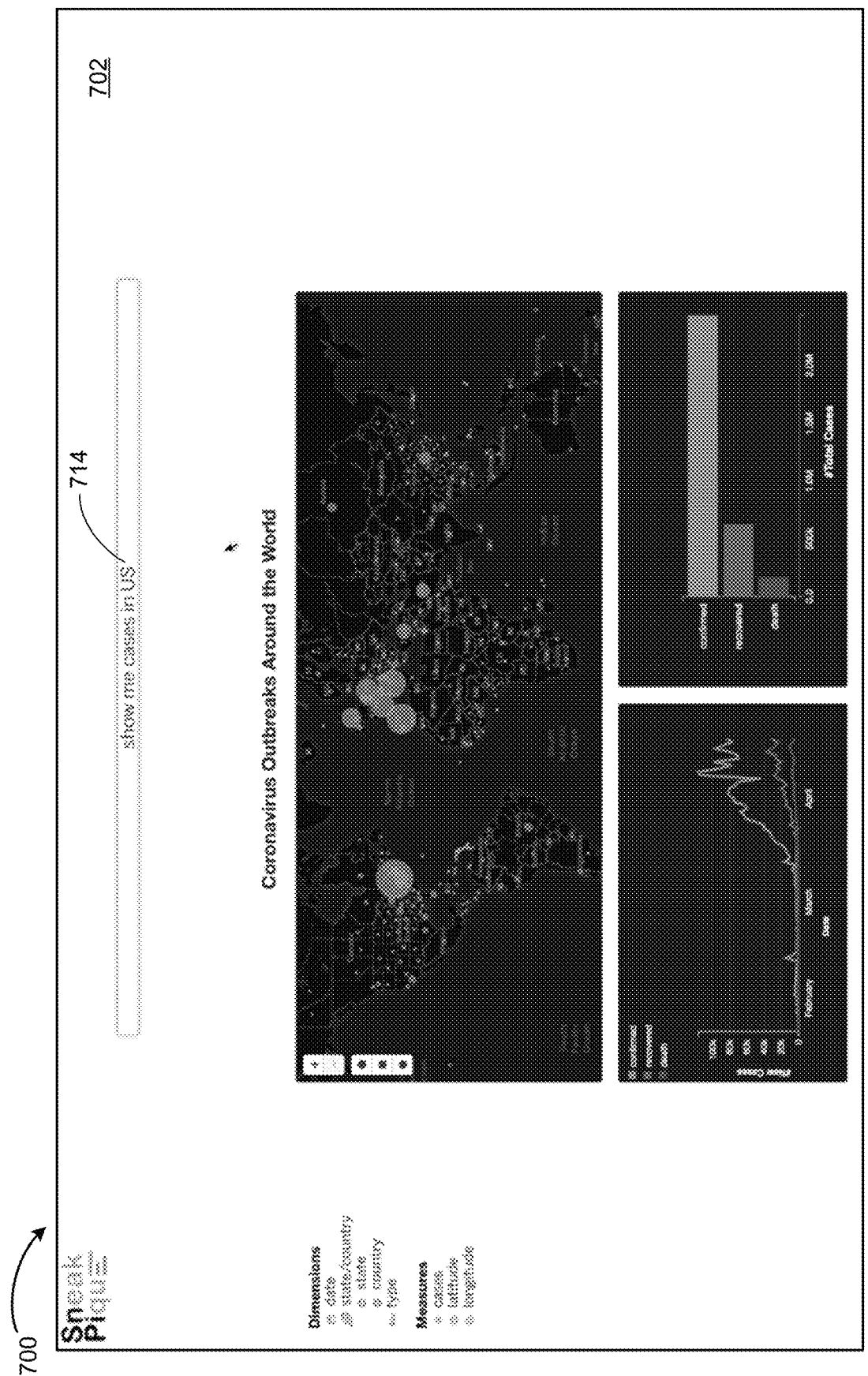
Figure 7H:
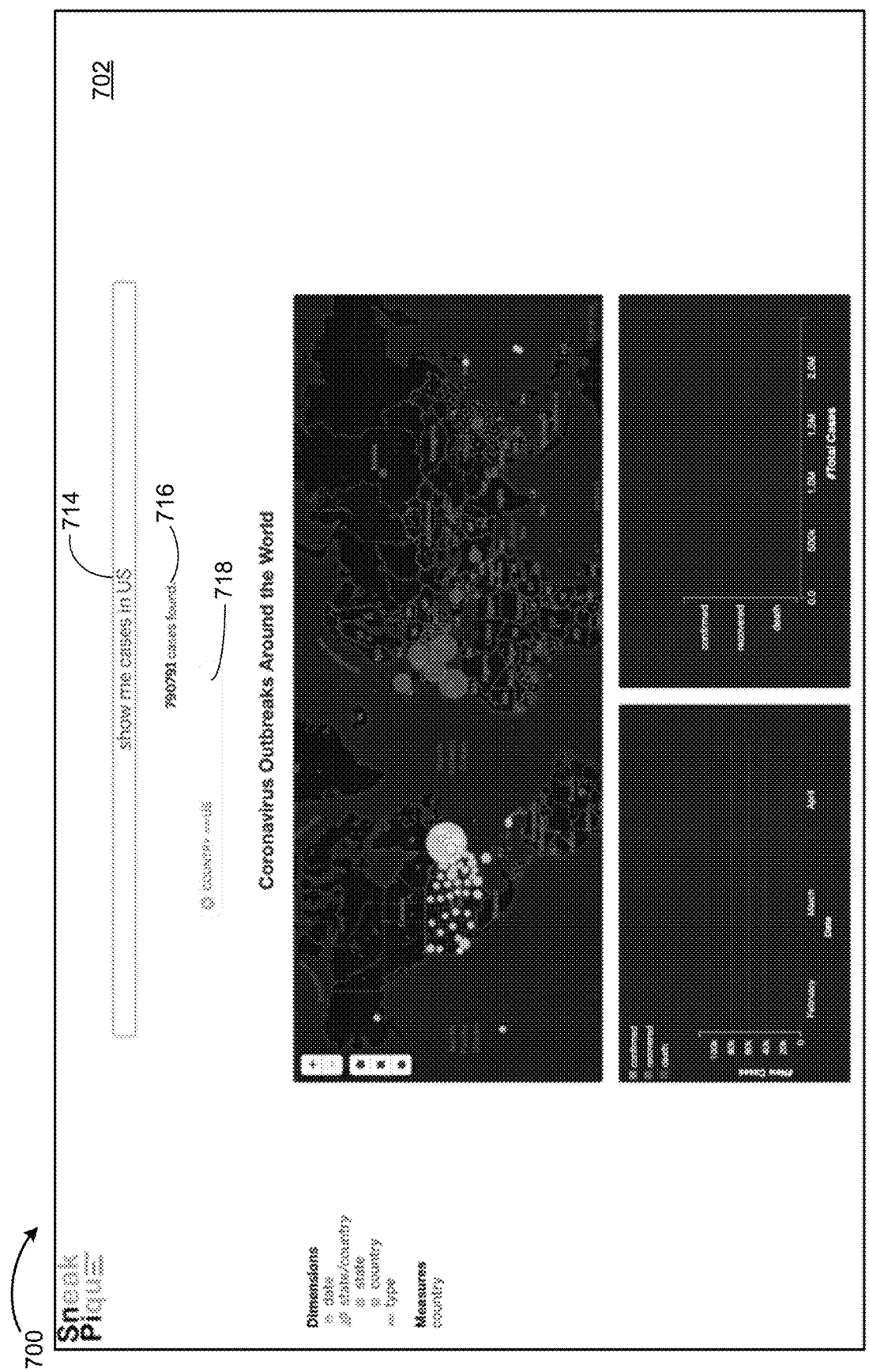
Figure 7I:
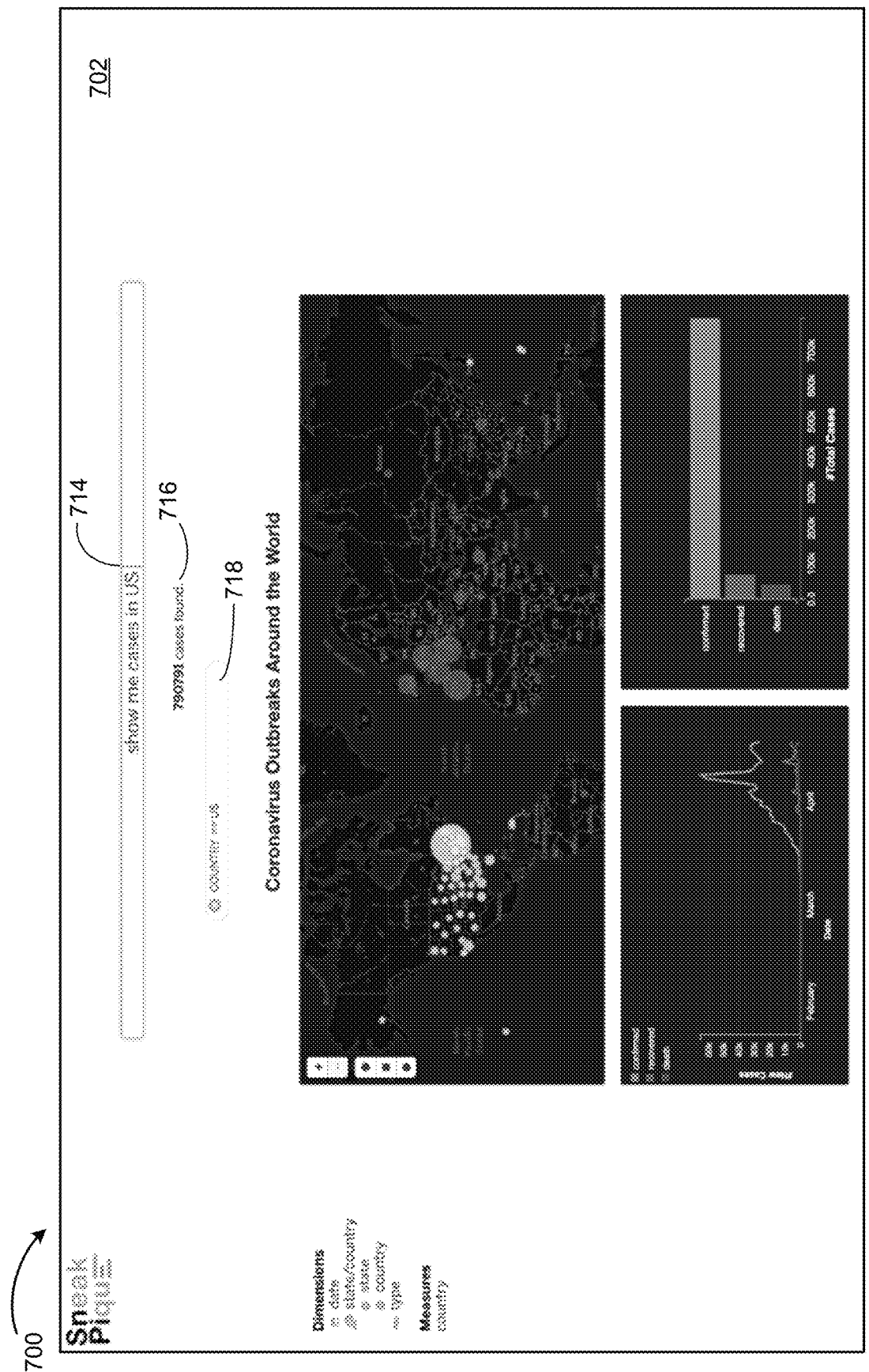
Figure 7J:
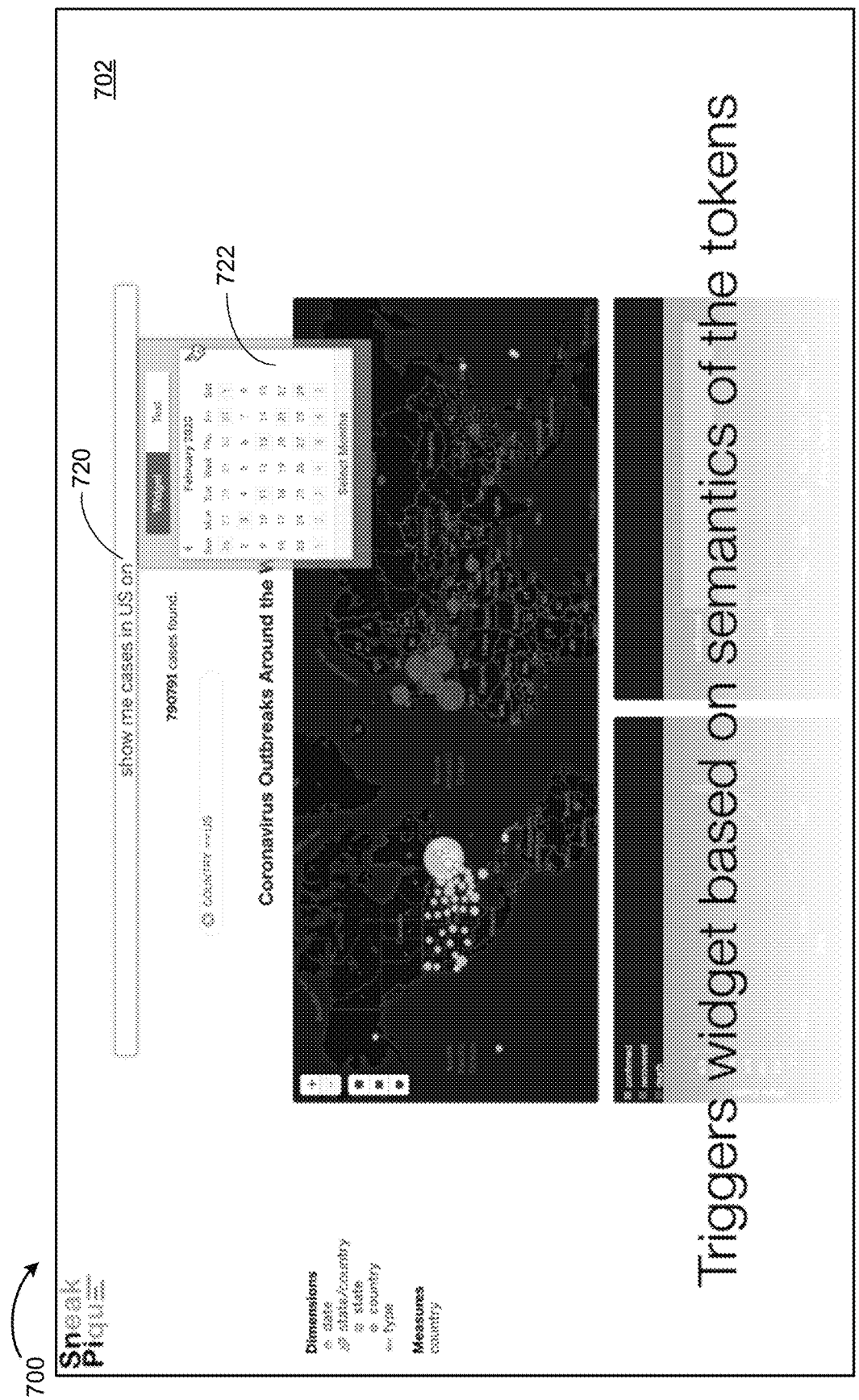
Figure 7K:
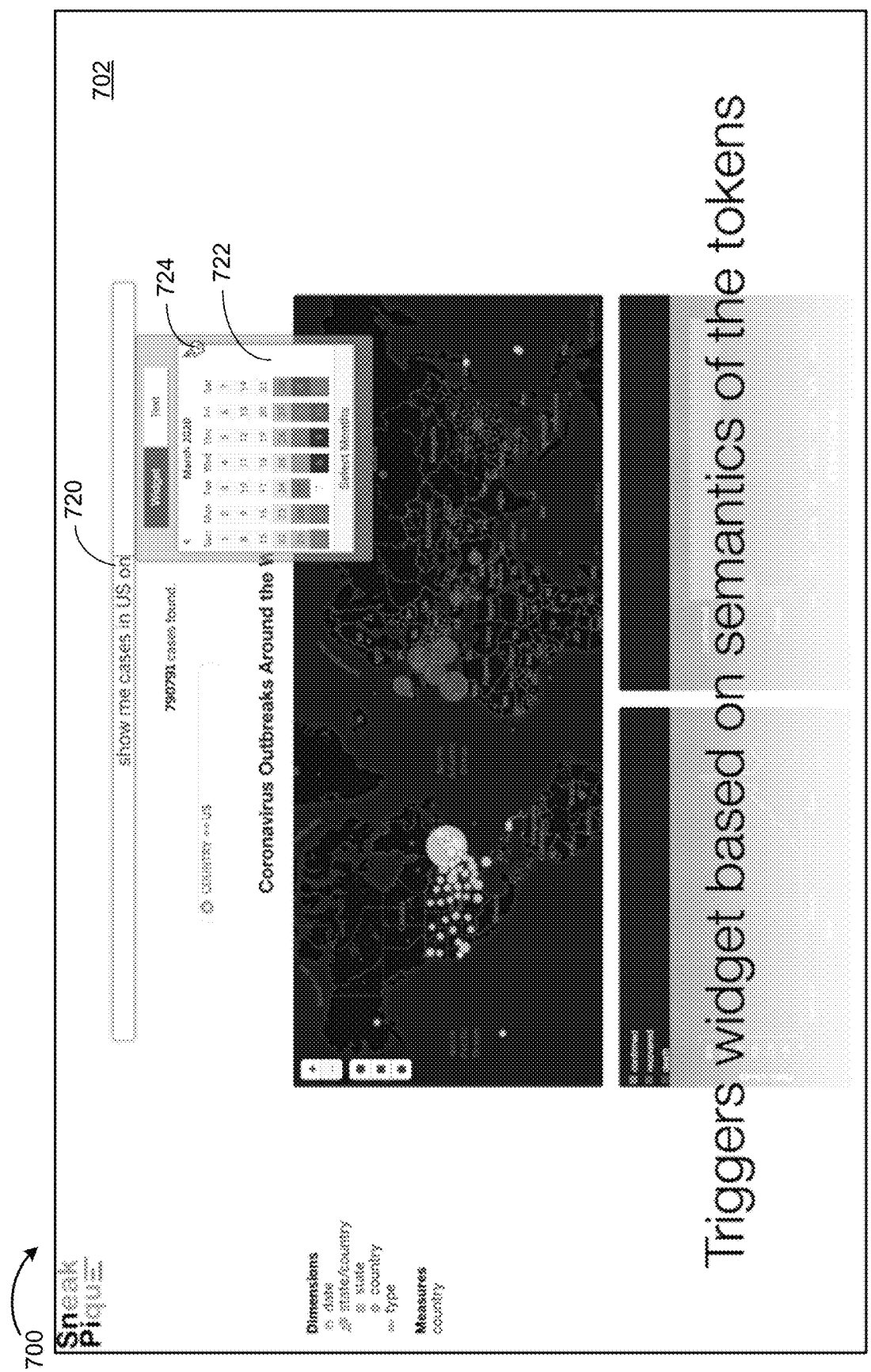
Figure 7L:
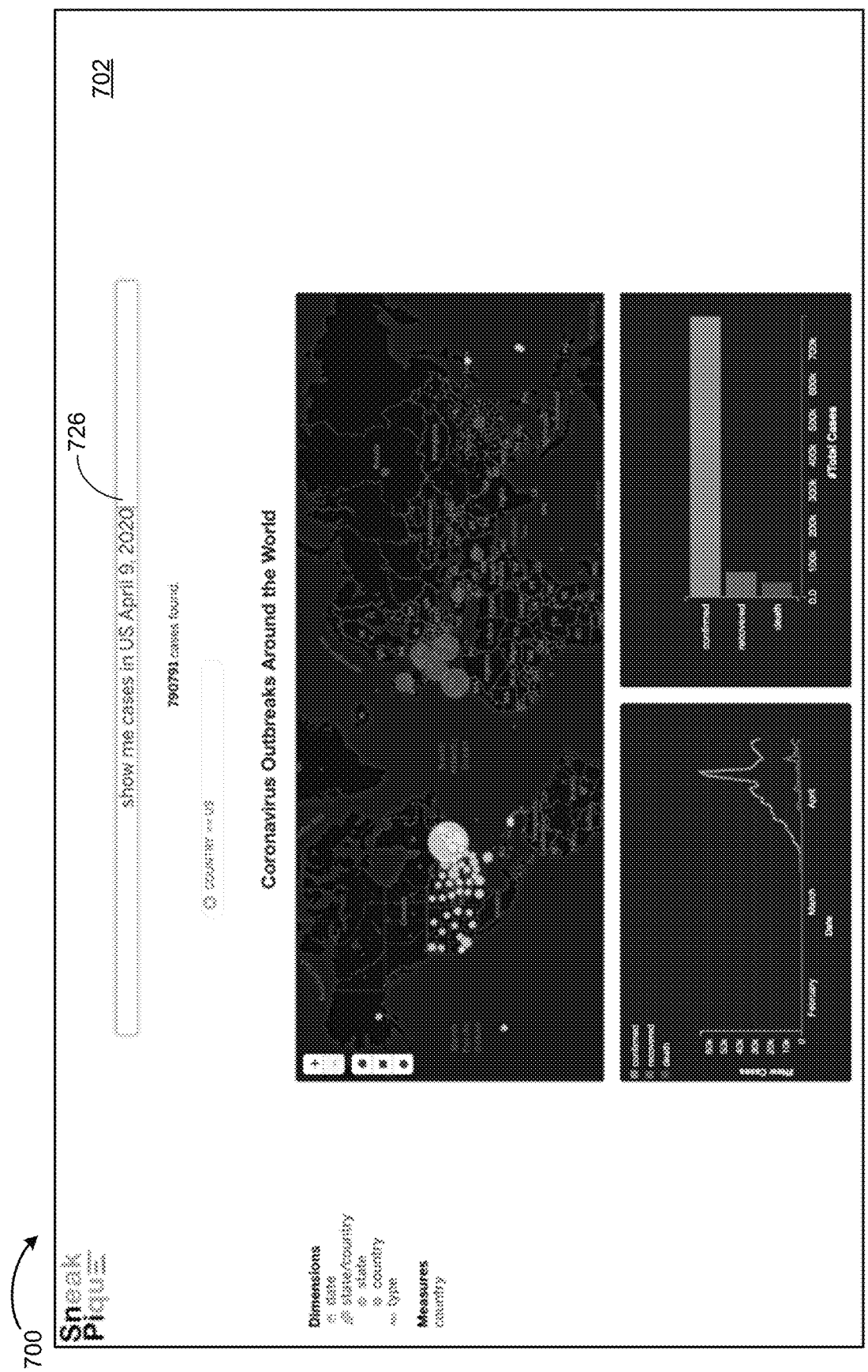
Figure 7M:
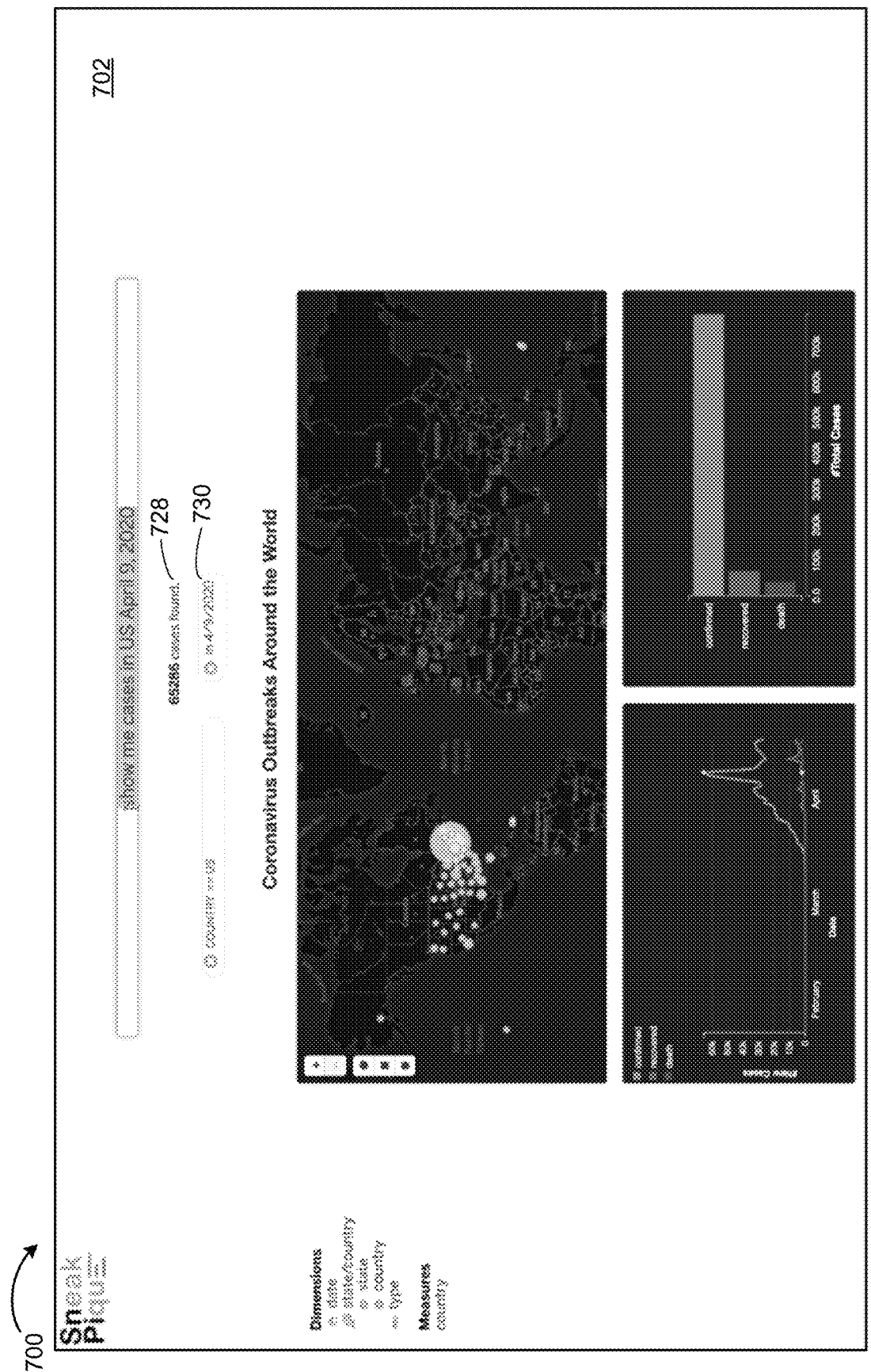

FIG. 7A shows an example dashboard 702 displayed on a user interface 700, according to some implementations. The example dashboard 702 shows coronavirus outbreaks around the world. FIG. 7B shows an update to the dashboard 702 when a user types "show" 704, and the system responds with autocompletion choices 706, according to some implementations. As shown next in FIG. 7C, when the user continues to type "show me cas" 704, the system narrows down the choices 706, according to some implementations. Next, as shown in FIG. 7D, suppose the user continues to type "show me cases in," the system responds by showing map and calendar widgets (e.g., the widgets 708 and 710) that appear to complete the query, according to some implementations. Note the data frequencies of the values are color coded in each of the widgets. FIG. 7E shows that the user has selected the US as the location 712 (from the map widget 708). FIG. 7E also shows data previews in the map and calendar widgets, according to some implementations. FIGS. 7F, 7G, 7H, and 7I show the dashboard 702 updated in response to the user selection 714, according to some implementations. FIGS. 7H and 7I show the system reporting the number of cases 716 found in the US, and that COUNTRY is set (718) to "US." FIG. 7J shows the user interface 700 after the user types the word "on" 720. This triggers widgets based on semantics of the token. In particular, the dashboard shows a calendar widget 722. FIG. 7K shows updates to the dashboard 702 when the user browses (724) to the month of March that shows a high incidence of cases of the virus in the US. Suppose the user selects the month of April (Apr. 9, 2020, in particular) 726, as shown in FIG. 7L. As shown in FIG. 7M, the dashboard is updated (e.g., number of cases found 728 and date 730 are updated) following the selection.

Figure 7N:
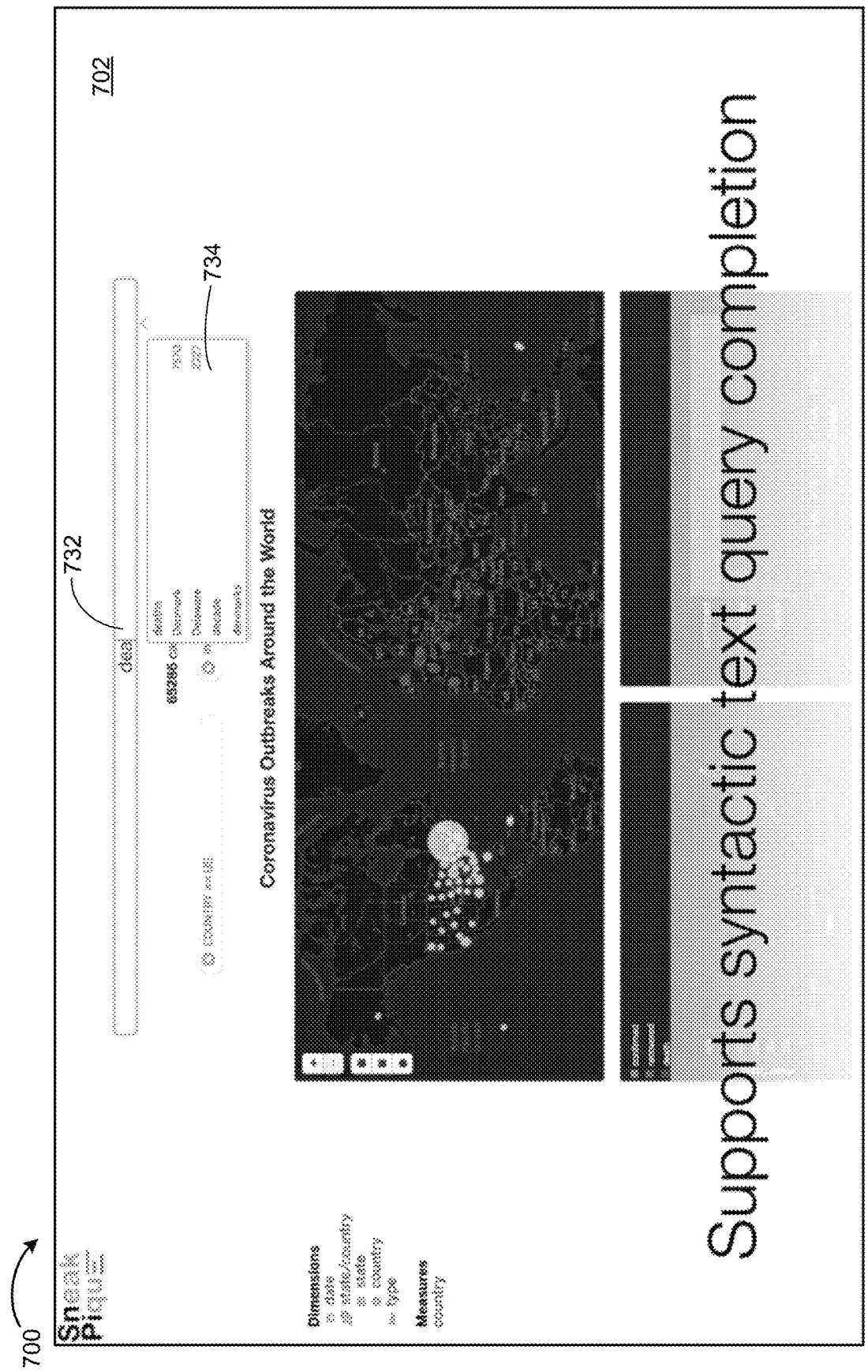
Figure 7O:
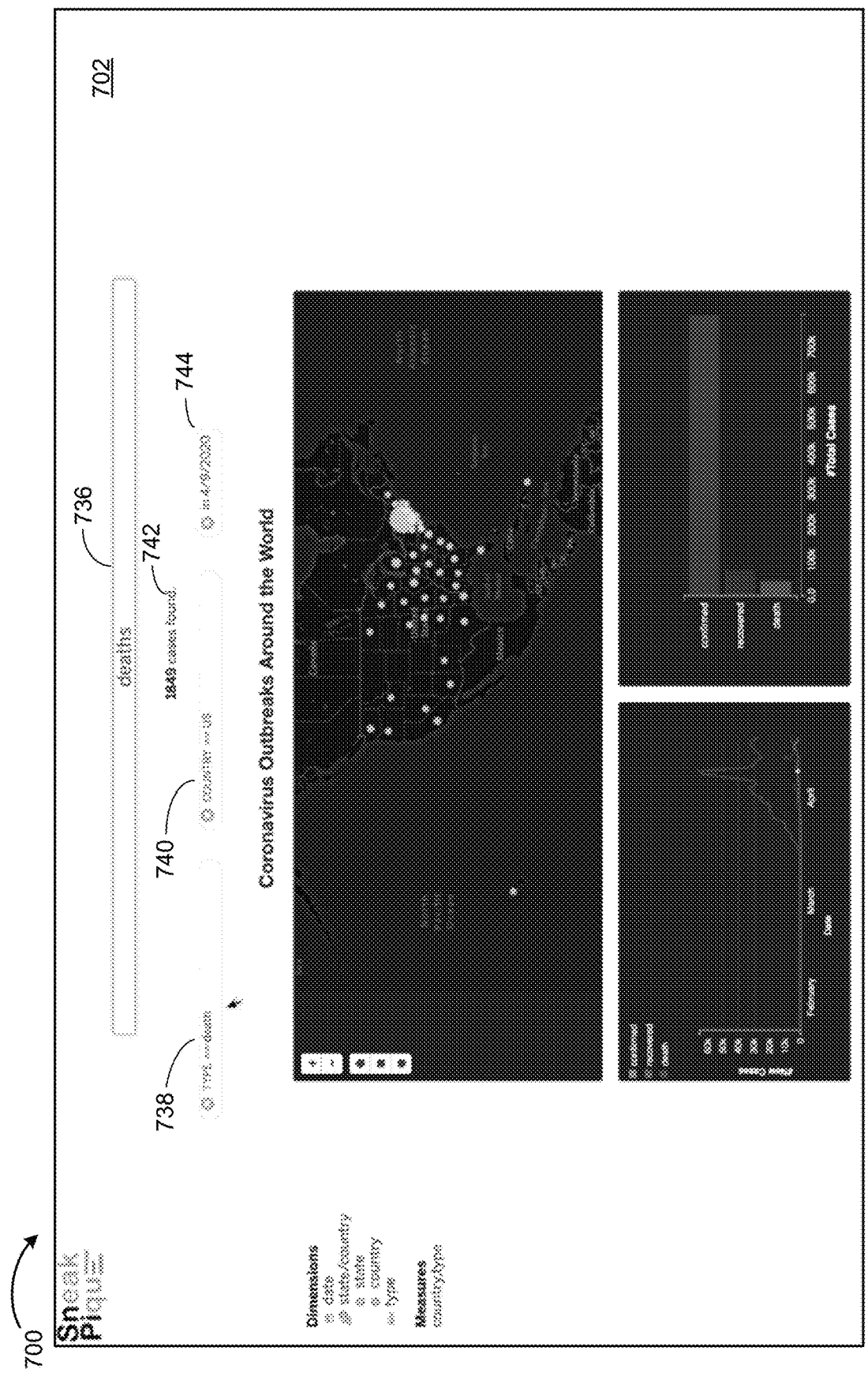
Figure 7P:
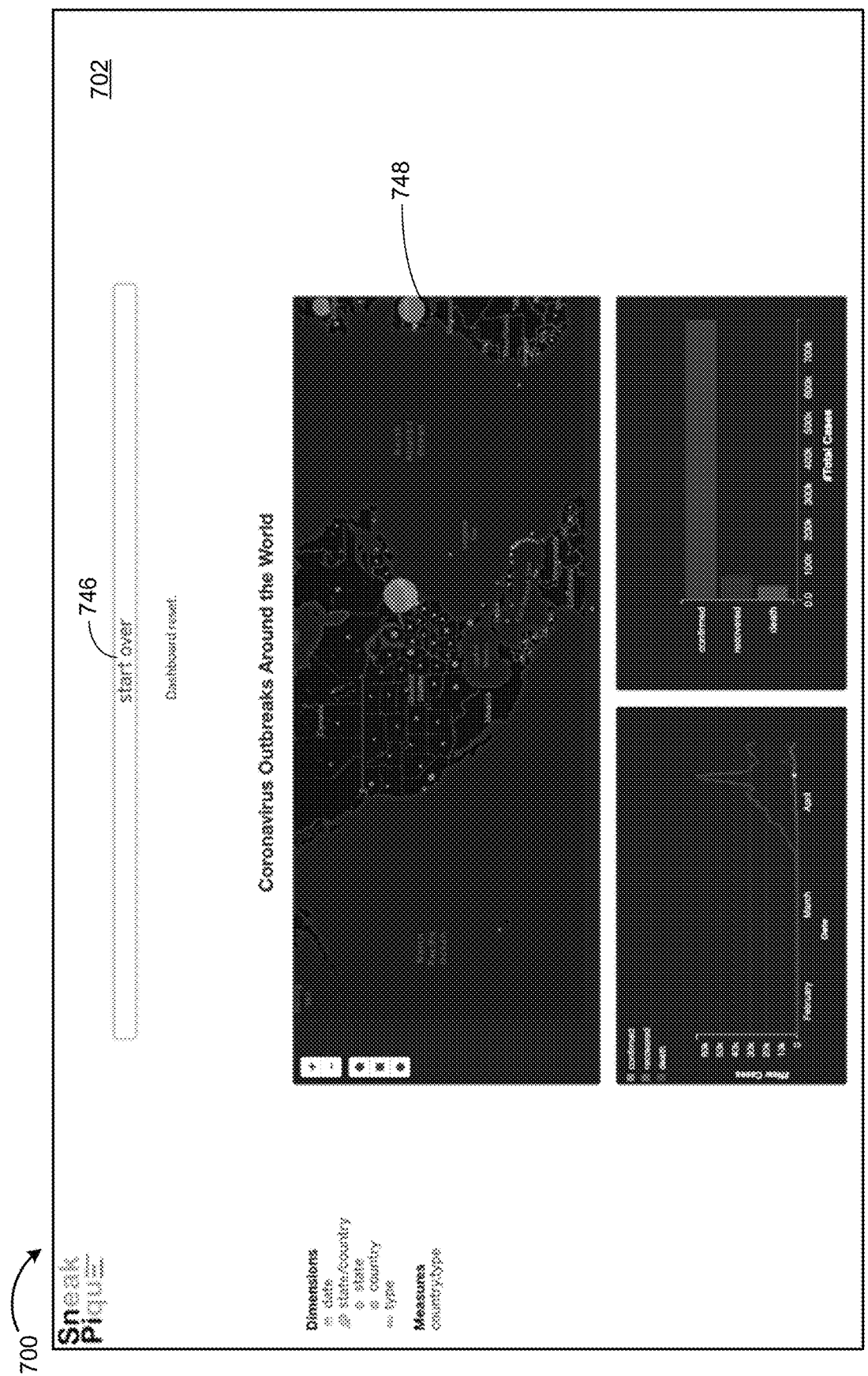
Figure 7Q:
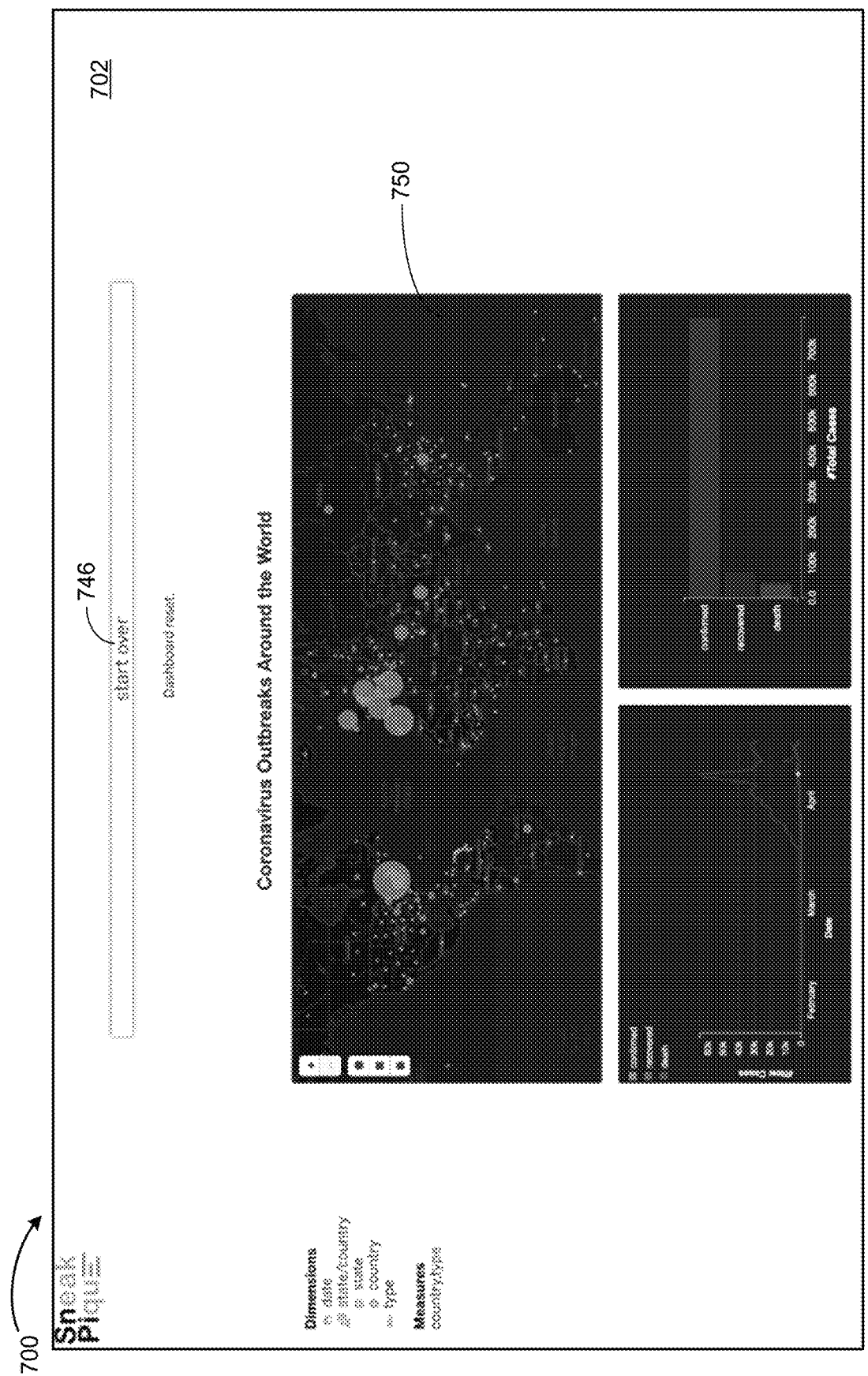
Figure 7R:
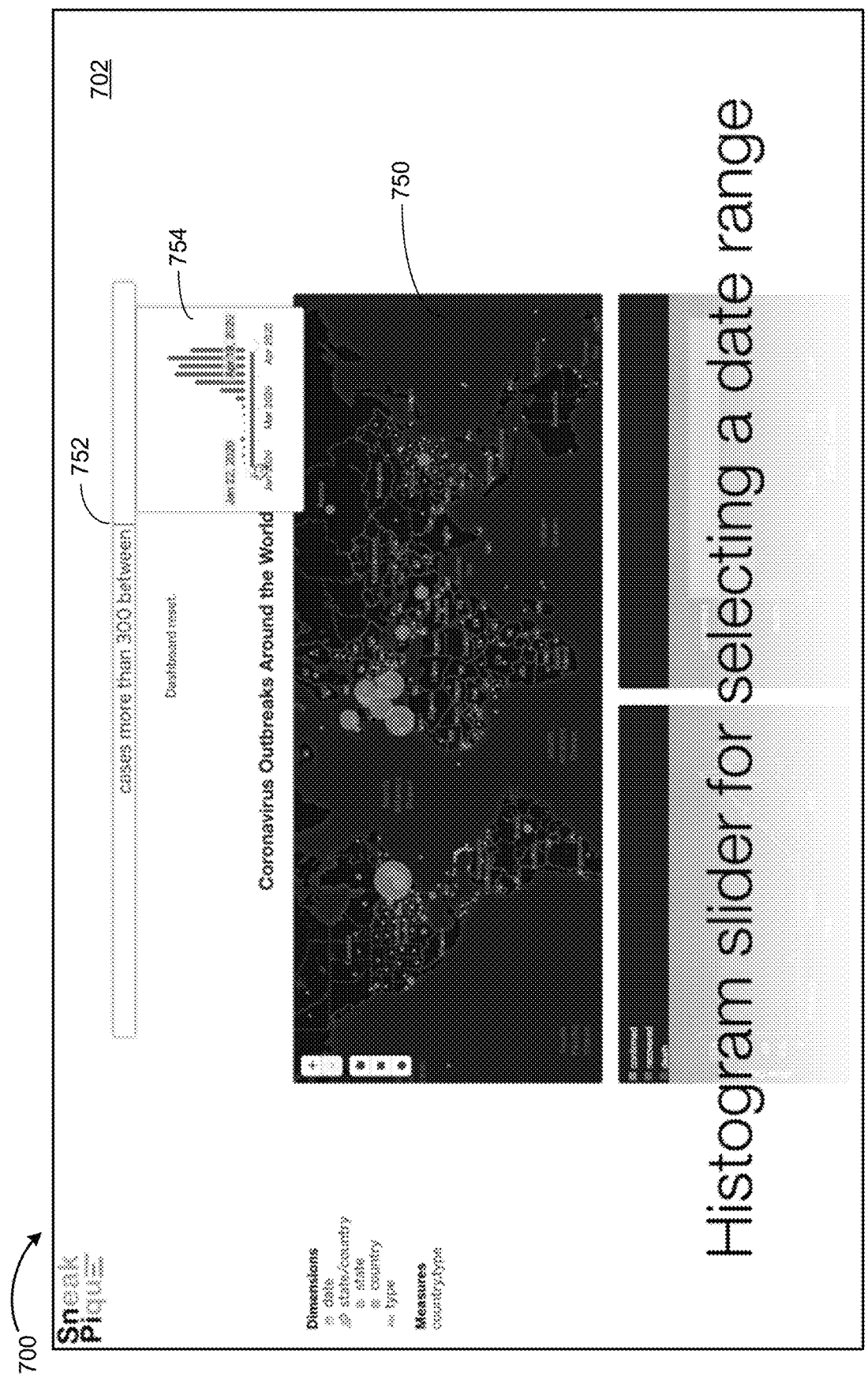
Figure 7S:
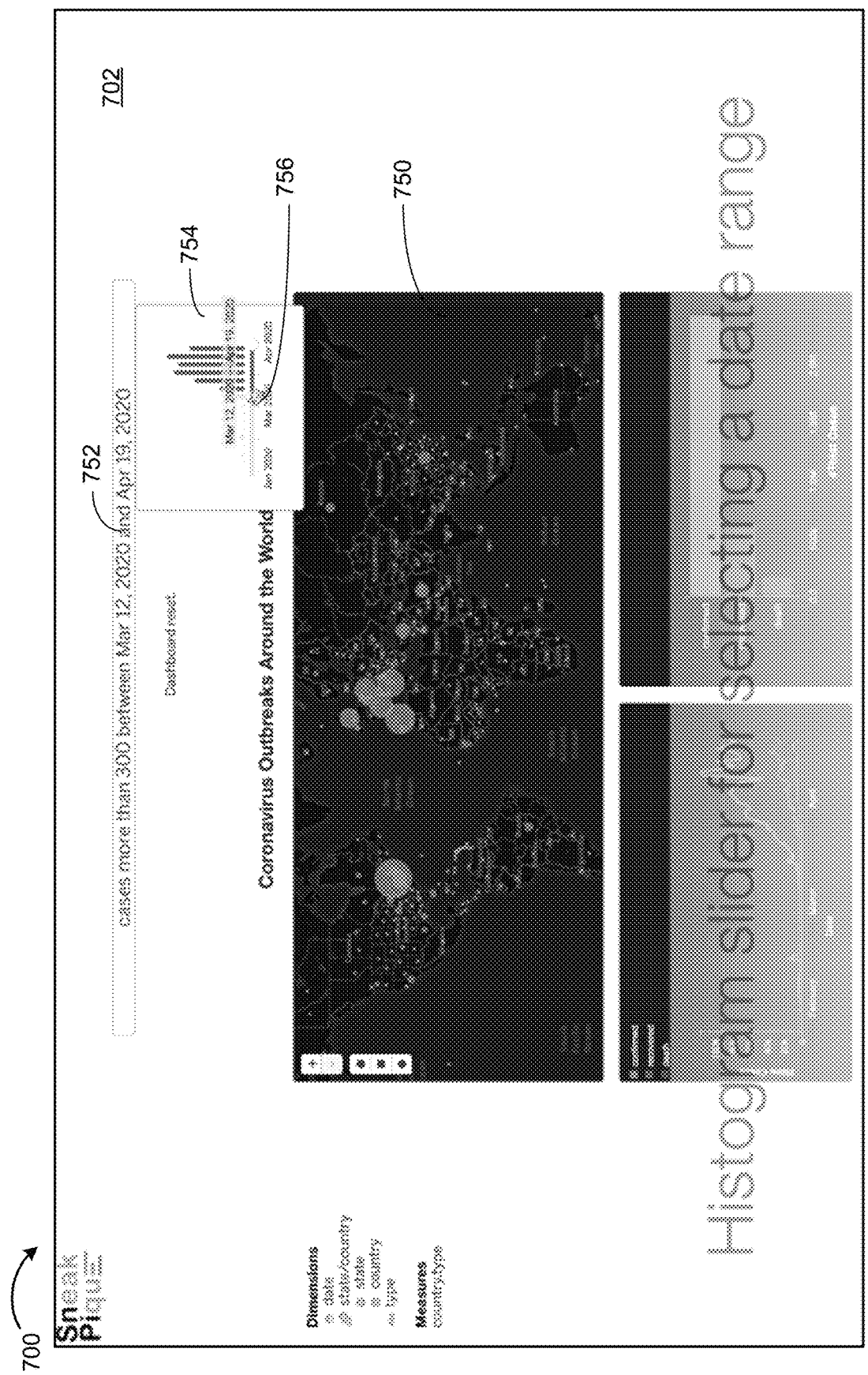
Figure 7T:
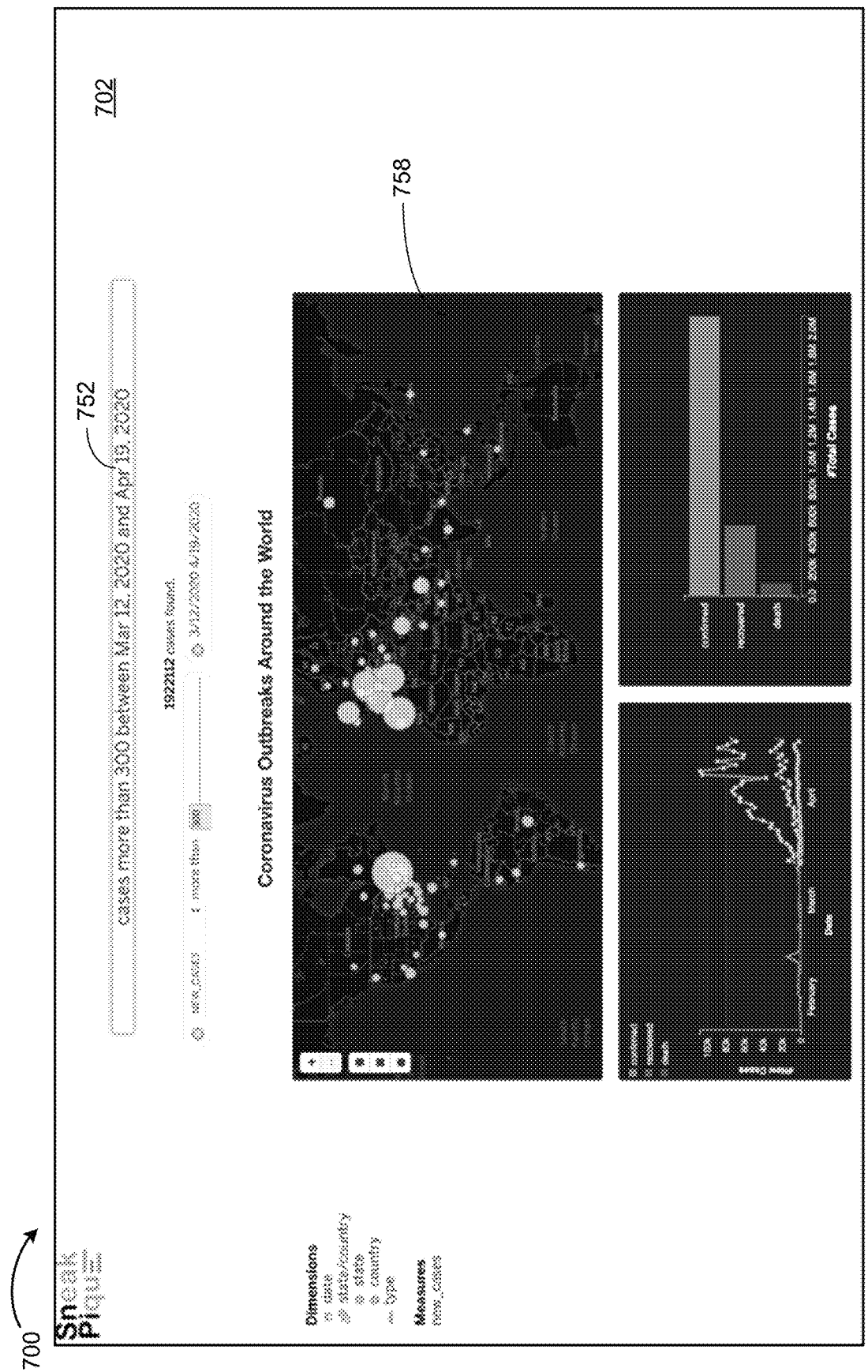
Figure 7U:
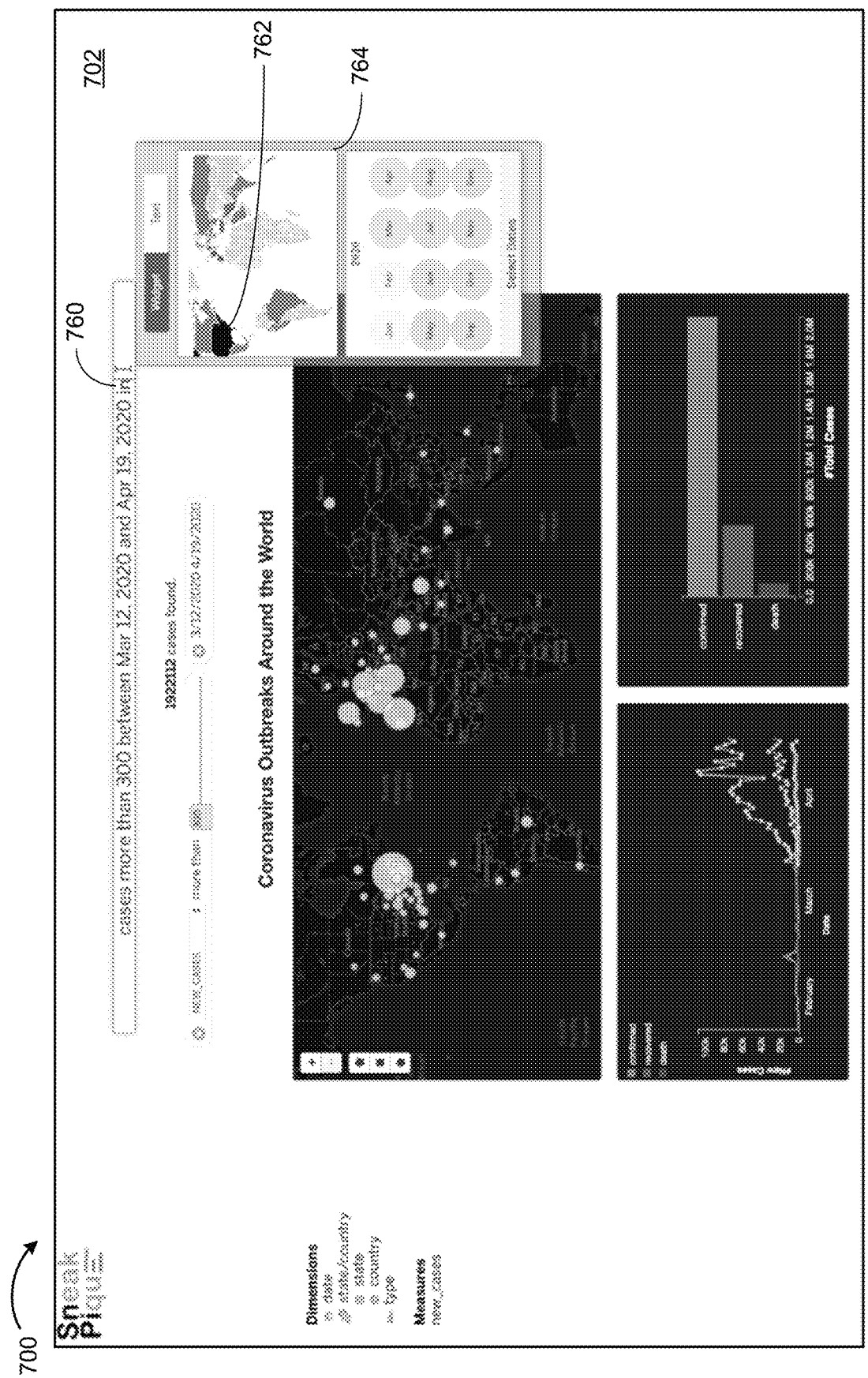

FIG. 7N shows the user interface after the user types a portion of the word "deaths" 732. In some implementations, the system supports syntactic text query completion, so the system suggests "deaths" as one of the options 734 for the user to select from. FIG. 7O shows updates to the dashboard after the selection of "deaths" 736. In particular, the dashboard is updated to show the number of cases 742 for deaths (738) in the US (740) as of Apr. 9, 2020 (744). Suppose next the user chooses to "start over" 746 as shown in FIG. 7P. Subsequently, as shown in FIG. 7Q, the dashboard is automatically updated (e.g., reset) in response to the user selection, to show the world map 750, instead of the deaths in the US as shown in the map 748 in FIG. 7P), and instances of Coronavirus (as data marks) on the world map. FIG. 7R shows the state of the user interface after the user typed "cases more than 300 between" 752. In response, a histogram slider 754 for selecting a data range pops up. FIG. 7S shows the user sliding (756) the histogram slider and selecting a date between Mar. 2, 2020 and Apr. 19, 2020. FIG. 7T shows an update 758 to the visualization in response to the selected date range 752. FIG. 7U shows the user interface after the user adds the word "in" 760. As shown in the example, only countries 762 with cases more than 300 in that date range are highlighted in the pop up window 764.

Figure 7V:
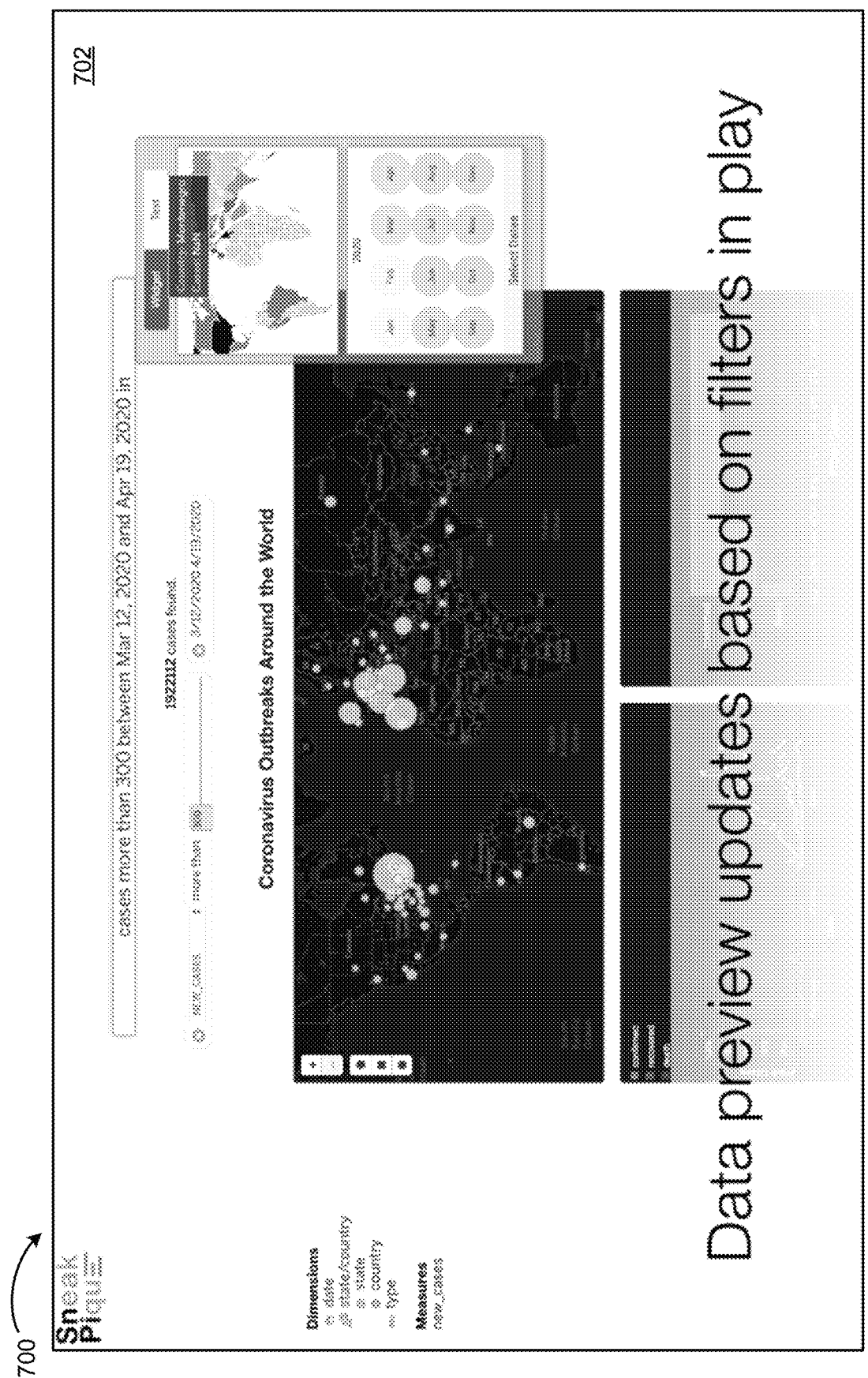
Figure 7W:
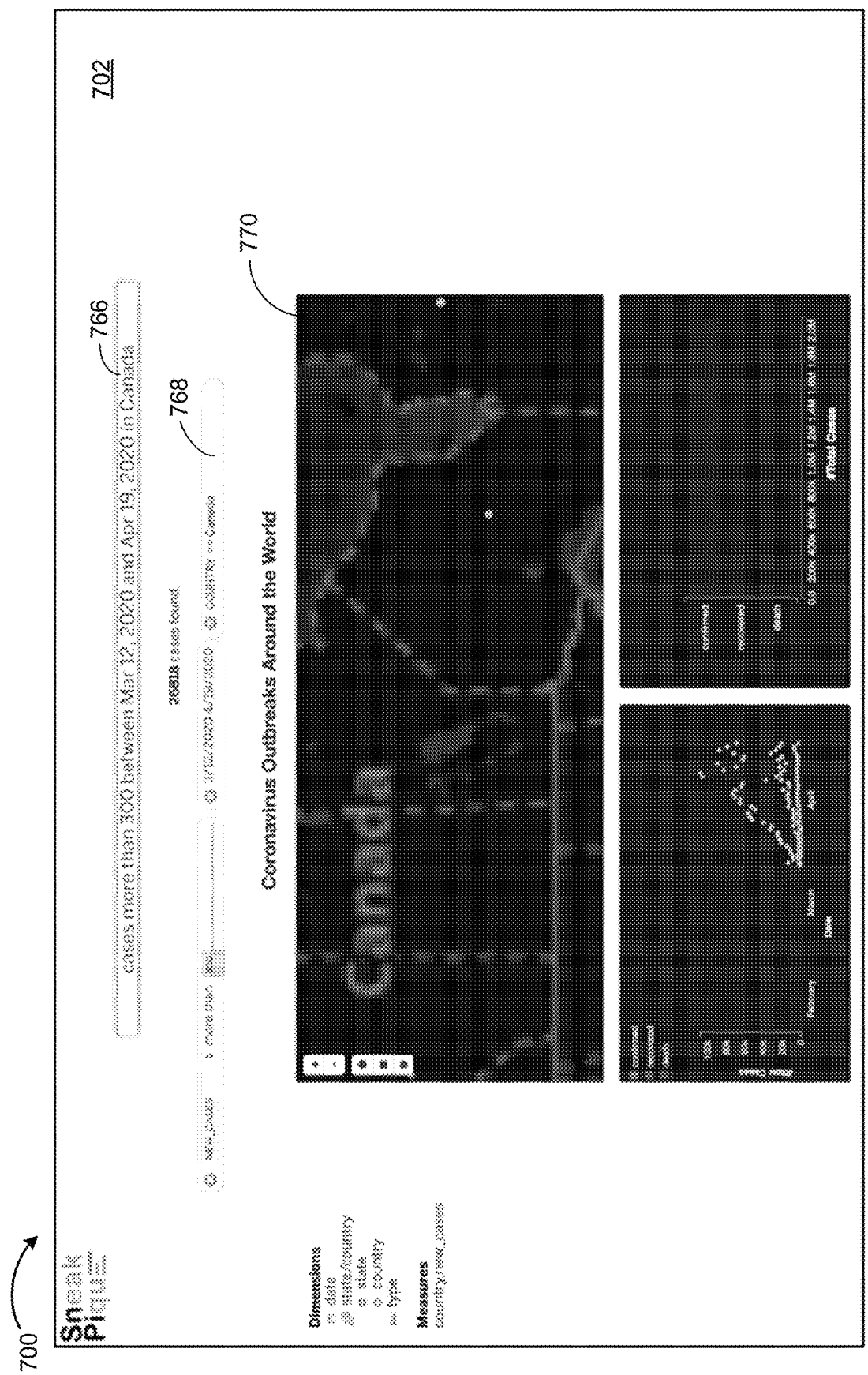

Referring next to FIG. 7V, in some implementations, data preview updates are based on filters in play (at the time user is interacting with the dashboard). Suppose the user selects Canada as the location 766. FIG. 7W shows an update 770 to the dashboard (as indicated by "COUNTRY=Canada" 768) in response to the user selection of the new location in FIG. 7V. In this way, data previews serve as a useful scaffold during visual analysis tasks, and help formulate complex user queries with multiple filters in play. The features also help users with analytical query completion. Widgets are used frequently for time, place, and range selection, and text is used for syntactic autocompletion. Some implementations also explore (e.g., weigh various options) for complex previews and personalization, for statistical previews, multi-selection of values, and saving custom preferences.

Figure 8A:
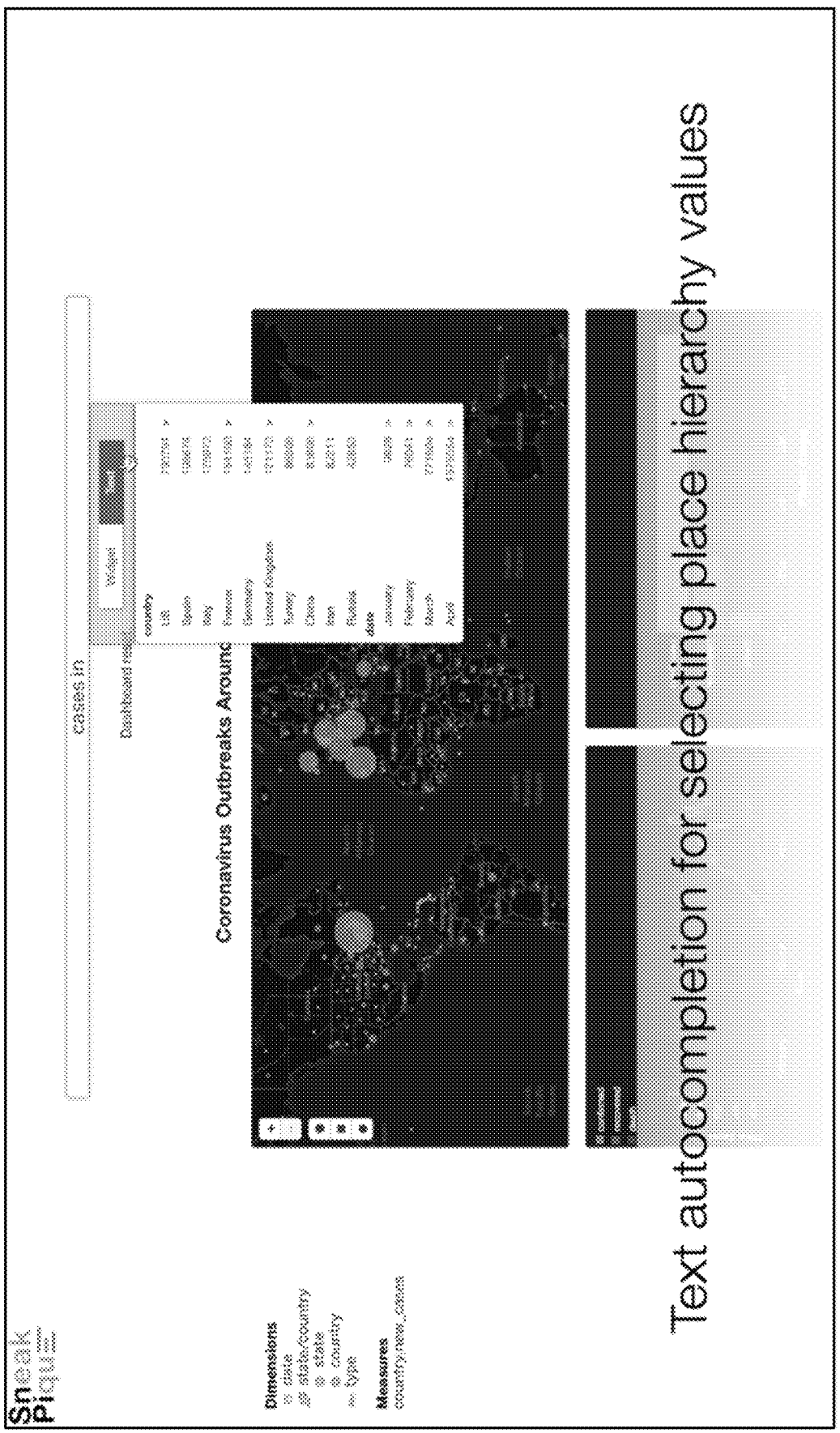
FIGS. 8A and 8B illustrate text autocompletion for selecting place hierarchy values, according to some implementations.
Figure 8B:

FIGS. 8A and 8B illustrate text autocompletion for selecting place hierarchy values, according to some implementations.

FIGS. 9A-9L provide a flowchart of a method 900 of utilizing (902) data discovery to support visual analysis of datasets, according to some implementations. The method is performed (904) at a computing system (e.g., the system 200) having one or more processors 202 and memory 206 storing (906) one or more programs configured for execution by the one or more processors. The method includes receiving (908) user selection of a data source. The method also includes presenting (910) a natural language interface for analysis of data from the selected data source. The method also includes receiving (912) user input to specify an incomplete natural language command directed to the data source.

The method also includes correlating (914) one or more words in the incomplete natural language command with a data field in the selected data source.

Figure 9A:
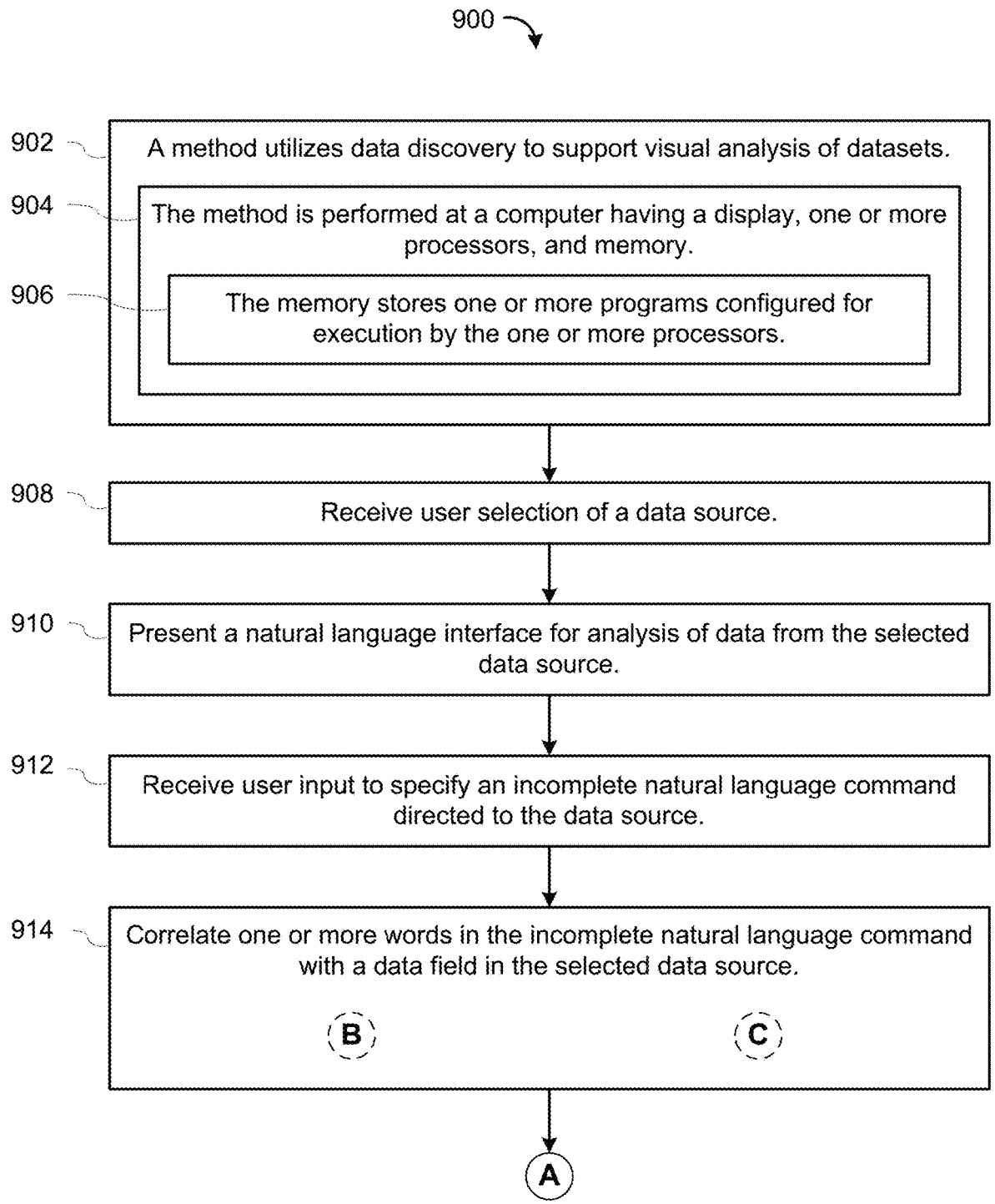
Figure 9B:
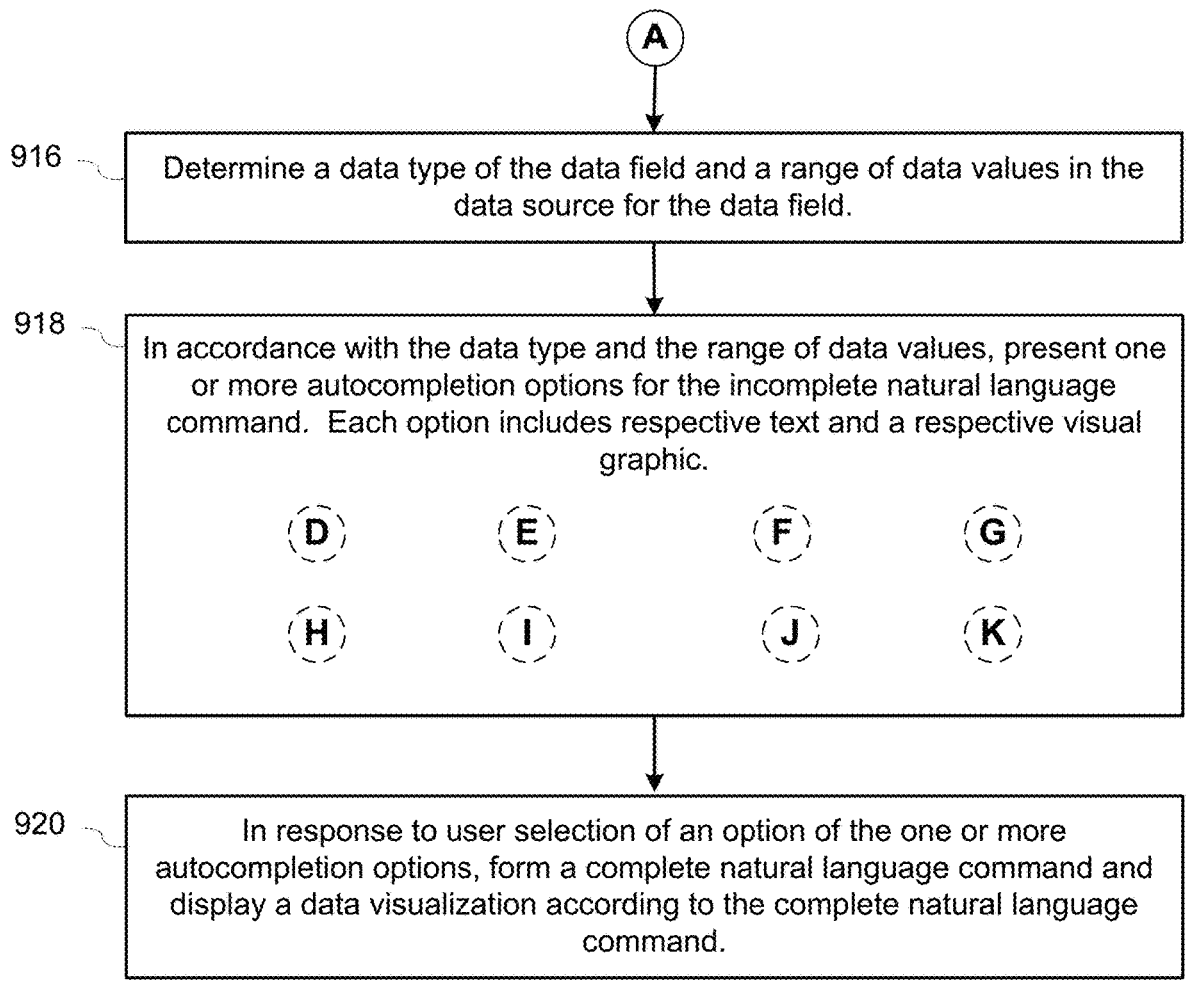
Figure 9C:
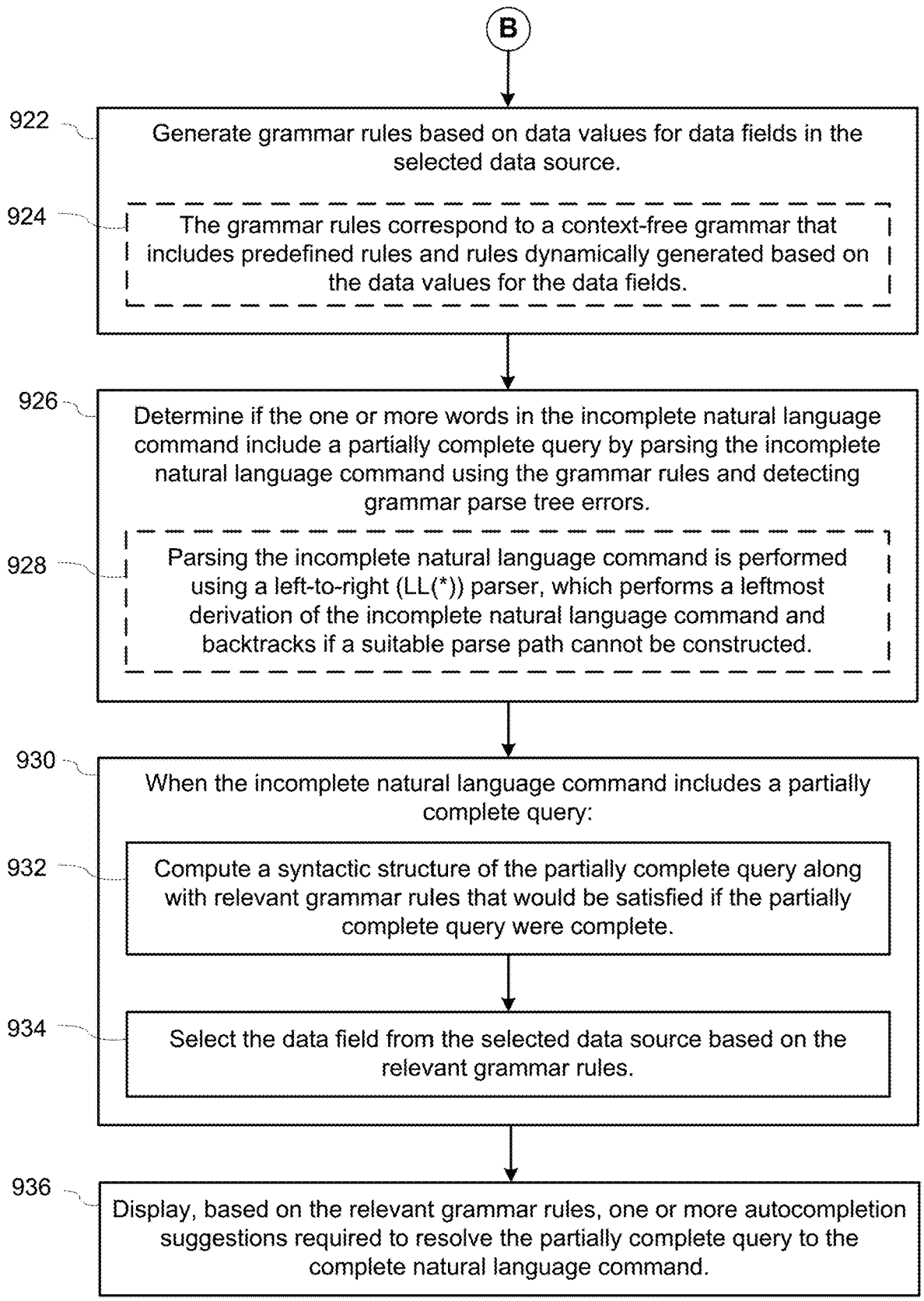

Referring next to FIG. 9C, in some implementations, correlating the one or more words in the incomplete natural language command with the data field in the selected data source includes generating (922) grammar rules based on data values for data fields in the selected data source. In some implementations, parsing the incomplete natural language command is performed (928) using a left-to-right (LL(*)) parser that performs a leftmost derivation of the incomplete natural language command and backtracks if a suitable parse path cannot be constructed. In some implementations, the method determines (926) if the one or more words in the incomplete natural language command includes a partially complete query by parsing the incomplete natural language command using the grammar rules and detecting grammar parse tree errors. In some implementations, the grammar rules correspond (924) to a context-free grammar that includes predefined rules and rules dynamically generated based on the data values for the data fields.

When the incomplete natural language command includes a partially complete query, the method performs (930): (a) computing (932) a syntactic structure of the partially complete query along with relevant grammar rules that would be satisfied if the partially complete query were complete; and (b) selecting (934) the data field from the selected data source based on the relevant grammar rules. In some implementations, the method further includes displaying (936), based on the relevant grammar rules, one or more auto-completion suggestions required to resolve the partially complete query to the complete natural language command. FIG. 7N and part (a) of FIG. 4B (described above) show examples of syntactic text query completion, according to some implementations. In other words, beyond generating appropriate visualizations by correlating the incomplete natural language command to underlying dataset, some implementations also provide text autocompletion without relating to underlying data fields (e.g., based on common language usage and/or based on historical usage data).

Figure 9D:
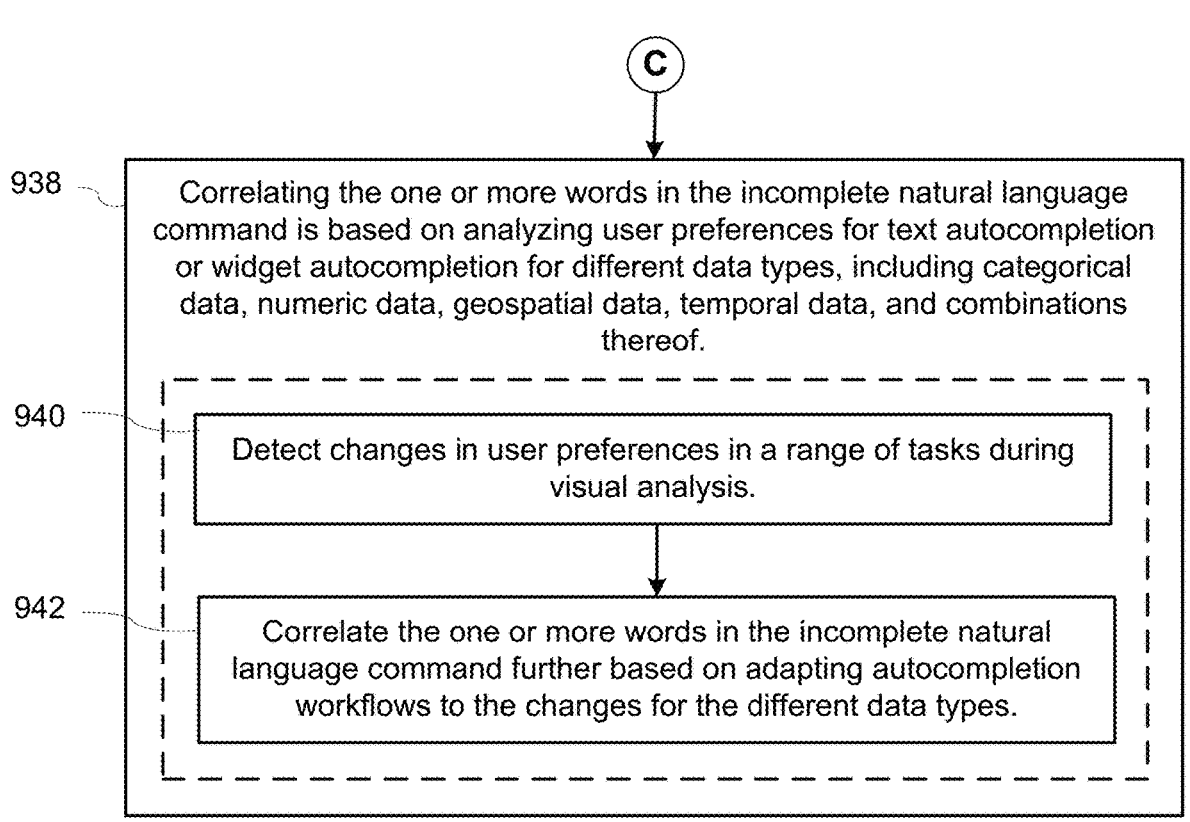

Referring next to FIG. 9D, in some implementations, correlating the one or more words in the incomplete natural language command is based (938) on analyzing user preferences for text autocompletion or widget autocompletion for different data types, including categorical data, numeric data, geospatial data, temporal data, and combinations thereof. In some implementations, the method further includes: (i) detecting (940) changes in user preferences in a range of tasks during visual analysis; and (ii) correlating (942) the one or more words in the incomplete natural language command further based on adapting autocompletion workflows to the changes for the different data types.

Referring back to FIG. 9B, the method also includes determining (916) a data type of the data field and a range of data values in the data source for the data field.

The method also includes, in accordance with the data type and the range of data values, presenting (918) one or more autocompletion options for the incomplete natural language command. Each option includes respective text and a respective corresponding visual graphic.

Referring next to FIG. 9E, in some implementations, when the data type is a categorical type, the method displays (944) a text list that shows suggestions for a categorical data field. The suggestions are sorted (944) numerically according to data frequency, and the text list includes a data preview that shows respective data frequencies for the data values of the data field.

Referring next to FIG. 9F, in some implementations, when the data type is a numeric type, the method displays (946) a histogram slider widget that shows a histogram of data frequencies for a numerical data field.

Referring next to FIG. 9G, in some implementations, when the data type is a geospatial type, the method displays (948) a map chart widget that shows a data preview of location values for a data field, showing numeric ranges as visual encodings.

Referring next to FIG. 9H, in some implementations, when the data type is a temporal type, the method displays (950) either (i) a text list that shows temporal data sorted in chronological order, (ii) a calendar widget that shows a temporal hierarchy of a first temporal data field, or (iii) a histogram slider widget that shows a histogram of data frequencies for a second temporal data field name. For example, FIGS. 7R and 7S (described above) illustrate a histogram slider for selecting a data range, according to some implementations.

Referring next to FIG. 9I, in some implementations, when the data type is both a geospatial type and a temporal type, the method displays (952) either (i) a text list with semantic grouping for hierarchical data or (ii) a combination of map and calendar widgets.

Referring next to FIG. 9J, in some implementations, when the data type corresponds to hierarchical data, the method provides (954) one or more text autocompletion options for selecting hierarchy values. FIGS. 8A and 8B (described above) show examples of text autocompletion options for selecting place hierarchy values, according to some implementations.

Referring next to FIG. 9K, in some implementations, presenting the one or more autocompletion options for the incomplete natural command includes: (i) detecting (956) a user input to select the respective text instead of the respective corresponding visual graphic for the data field; and (ii) in response to detecting the user input to select the respective text, switching (958) from displaying the respective corresponding visual graphic to displaying the respective text. The respective text provides one or more text autocompletion options. FIGS. 8A and 8B (described above) show examples of widget and text, according to some implementations.

Figure 9L:
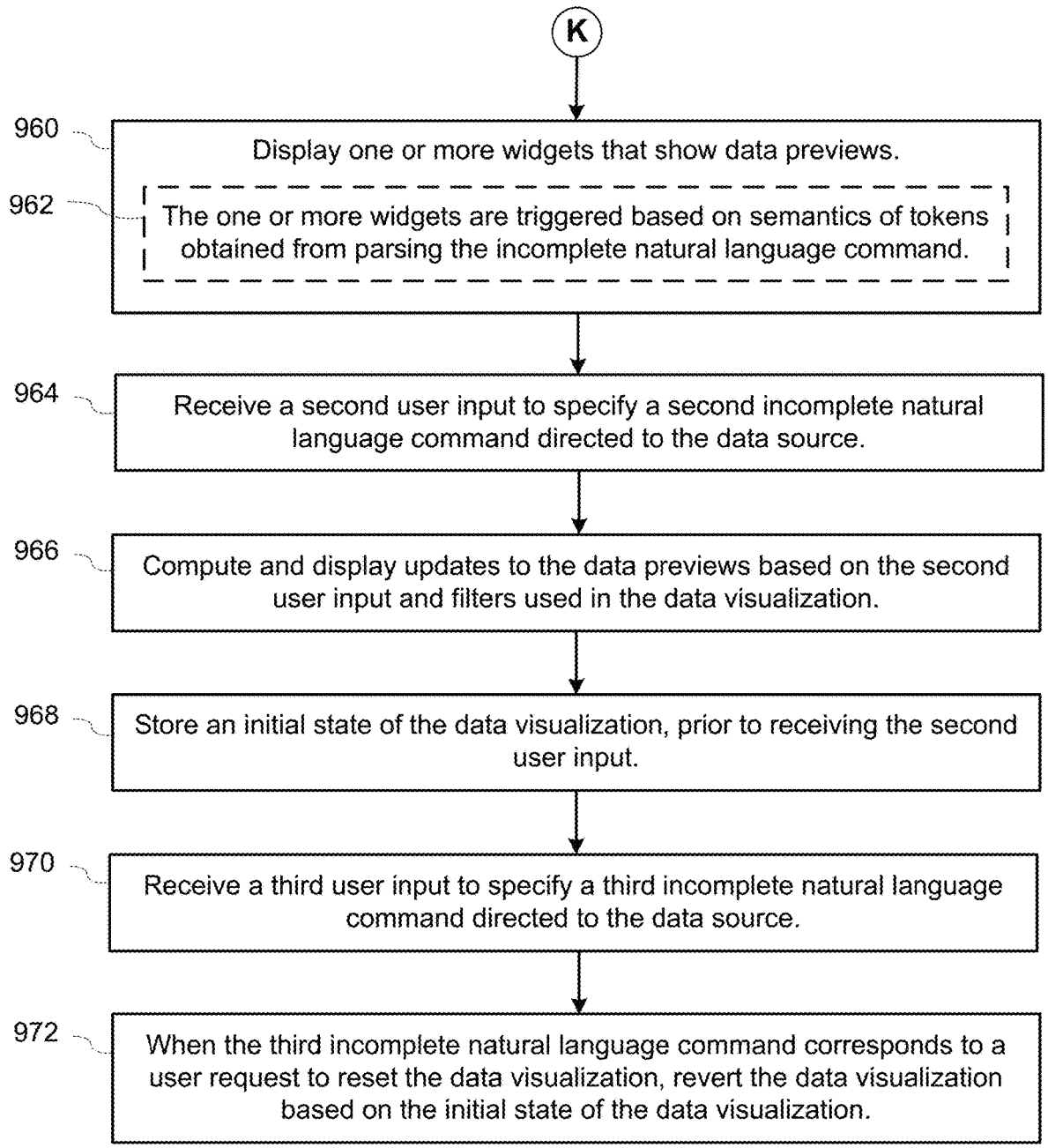

Referring next to FIG. 9L, in some implementations, presenting the one or more autocompletion options for the incomplete natural command includes displaying (960) one or more widgets that show data previews. For example, FIG. 7E (described above) shows example data previews, according to some implementations. In some implementations, the one or more widgets are triggered (962) based on semantics of tokens obtained from parsing the incomplete natural language command. FIGS. 7J and 7K show examples of widgets triggered based on token semantics obtained from parsing the incomplete natural language command, according to some implementations. In some implementations, the method further includes: (i) receiving (964) a second user input to specify a second incomplete natural language command directed to the data source; and (ii) computing and displaying (966) updates to the data previews based on the second user input and filters used in the data visualization. FIGS. 7V and 7W (described above) show examples of updates to data previews, according to some implementations. Some implementations store or keep contexts from previous visualizations and reuse the context in future visualizations. For example, when user types "deaths", some implementations understand the user is referring to deaths in relation to location and/or time shown in current visualization, and updates the visualization accordingly. FIGS. 7M, 7N, and 7O (described above) show examples of updating one or more data visualizations based on the data field, according to some implementations. For further illustration, in FIG. 7M, a different part of a world map is populated with data or is highlighted, according to some implementations.

In some implementations, the method further includes: (i) storing (968) an initial state of the data visualization, prior to receiving the second user input; (ii) receiving (970) a third user input to specify a third incomplete natural language command directed to the data source; and (iii) when the third incomplete natural language command corresponds to a user request to reset the data visualization, reverting (972) the data visualization based on the initial state of the data visualization. FIGS. 7P and 7Q (described above) show examples of resetting to an initial visualization, according to some implementations.

Referring back to FIG. 9B, the method also includes, in response to user selection of an option of the one or more autocompletion options, forming (920) a complete natural language command and displaying a data visualization according to the complete natural language command.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of utilizing data discovery to support visual analysis of datasets, comprising:
 at a computing system having one or more processors and memory storing one or more programs configured for execution by the one or more processors:
  receiving user selection of a data source;
  presenting a natural language interface for analysis of data in the selected data source;
  receiving user input to specify an incomplete natural language command directed to the data source;
  correlating one or more words in the incomplete natural language command with a data field in the selected data source;
  determining a data type of the data field and a range of data values in the data source for the data field;
  in accordance with the data type and the range of data values, presenting one or more autocompletion options for the incomplete natural language command, including displaying one or more widgets that show data previews, wherein each option includes respective text and a respective corresponding visual graphic; and in response to user selection of an option of the one or more autocompletion options, forming a complete natural language command and displaying a data visualization according to the complete natural language command.

2. The method of claim 1, wherein correlating the one or more words in the incomplete natural language command with the data field in the selected data source comprises:

generating grammar rules based on data values for data fields from the selected data source;

determining if the one or more words in the incomplete natural language command include a partially complete query by parsing the incomplete natural language command using the grammar rules and detecting grammar parse tree errors; and in accordance with a determination that the incomplete natural language command includes a partially complete query:

computing a syntactic structure of the partially complete query and relevant grammar rules that would be satisfied if the partially complete query were complete; and selecting the data field from the selected data source based on the relevant grammar rules.

3. The method of claim 2, further comprising:

displaying, based on the relevant grammar rules, one or more autocompletion suggestions required to resolve the partially complete query to the complete natural language command.

4. The method of claim 2, wherein parsing the incomplete natural language command is performed using a left-to-right (LL(*)) parser, which performs a leftmost derivation of the incomplete natural language command and backtracks if a suitable parse path cannot be constructed.

5. The method of claim 2, wherein the grammar rules correspond to a context-free grammar that includes pre-defined rules and rules dynamically generated based on the data values of the data fields in the data set.

6. The method of claim 1, wherein correlating the one or more words in the incomplete natural language command is based on analyzing user preferences for text autocompletion or widget autocompletion for different data types, including categorical data, numeric data, geospatial data, temporal data, and combinations thereof.

7. The method of claim 6, further comprising:

detecting changes in user preferences in a range of tasks during visual analysis; and correlating the one or more words in the incomplete natural language command further based on adapting autocompletion workflows to the changes for the different data types.

8. The method of claim 1, wherein presenting the one or more autocompletion options for the incomplete natural command comprises:

in accordance with a determination that the data type is a categorical type, displaying a text list that shows suggestions for a categorical data field, wherein the suggestions are sorted numerically according to data frequency, and the text list includes a data preview that shows respective data frequencies for the suggestions.

9. The method of claim 1, wherein presenting the one or more autocompletion options for the incomplete natural command comprises:

in accordance with a determination that the data type is a numeric type, displaying a histogram slider widget that shows a histogram of data frequencies for a numerical data field.

10. The method of claim 1, wherein presenting the one or more autocompletion options for the incomplete natural command comprises:

in accordance with a determination that the data type is a geospatial type, displaying a map chart widget that shows a data preview of location values for a data field, showing numeric ranges as visual encodings.

11. The method of claim 1, wherein presenting the one or more autocompletion options for the incomplete natural command comprises:

in accordance with a determination that the data type is a temporal type, displaying either (i) a text list that shows temporal data sorted in chronological order, (ii) a calendar widget that shows a temporal hierarchy of a first temporal data field, or (iii) a histogram slider widget that shows a histogram of data frequencies for a second temporal data field.

12. The method of claim 1, wherein presenting the one or more autocompletion options for the incomplete natural command comprises:

in accordance with a determination that the data type is both a geospatial type and a temporal type, displaying either (i) a text list with semantic grouping for hierarchical data, or (ii) a combination of map and calendar widgets.

13. The method of claim 1, wherein the one or more widgets are triggered based on semantics of tokens obtained from parsing the incomplete natural language command.

14. The method of claim 1, further comprising: receiving a second user input to specify a second incomplete natural language command directed to the data source; and computing and displaying updates to the data previews based on the second user input and filters used in the data visualization.

15. The method of claim 14, further comprising:

storing an initial state of the data visualization, prior to receiving the second user input;

receiving a third user input to specify a third incomplete natural language command directed to the data source; and in accordance with a determination that the third incomplete natural language command corresponds to a user request to reset the data visualization, reverting the data visualization based on the initial state of the data visualization.

16. The method of claim 1, wherein presenting the one or more autocompletion options for the incomplete natural command comprises:

detecting a user input to select the respective text instead of the respective corresponding visual graphic for the data field; and in response to detecting the user input to select the respective text, switching from displaying the respective corresponding visual graphic to displaying the respective text, wherein the respective text provides one or more text autocompletion options.

17. The method of claim 1, wherein presenting the one or more autocompletion options for the incomplete natural command comprises:

in accordance with a determination that the data type corresponds to hierarchical data, providing one or more text autocompletion options for selecting hierarchy values.

18. A computer system for utilizing data discovery to support visual analysis of datasets, comprising:
one or more processors; and
memory;
wherein the memory stores one or more programs configured for execution by the one or more processors, and the one or more programs comprising instructions for:
receiving user selection of a data source;
presenting a natural language interface for analysis of data in the selected data source;
receiving user input to specify an incomplete natural language command directed to the data source;
correlating one or more words in the incomplete natural language command with a data field in the selected data source;
determining a data type of the data field and a range of data values in the data source for the data field;
in accordance with the data type and the range of data values, presenting one or more autocompletion options for the incomplete natural language command, including displaying one or more widgets that show data previews, wherein each option includes respective text and a respective corresponding visual graphic; and
in response to user selection of an option of the one or more autocompletion options, forming a complete natural language command and displaying a data visualization according to the complete natural language command.

19. A non-transitory computer-readable storage medium storing one or more programs configured for execution by a computer system having a display, one or more processors, and memory, the one or more programs comprising instructions for:
receiving user selection of a data source;
presenting a natural language interface for analysis of data in the selected data source;
receiving user input to specify an incomplete natural language command directed to the data source;
correlating one or more words in the incomplete natural language command with a data field in the selected data source;
determining a data type of the data field and a range of data values in the data source for the data field;
in accordance with the data type and the range of data values, presenting one or more autocompletion options for the incomplete natural language command, including displaying one or more widgets that show data previews, wherein each option includes respective text and a respective corresponding visual graphic; and
in response to user selection of an option of the one or more autocompletion options, forming a complete natural language command and displaying a data visualization according to the complete natural language command.

* * * * *